(12) United States Patent
Zumsteg

(10) Patent No.: US 7,515,092 B2
(45) Date of Patent: Apr. 7, 2009

(54) SUB-FRAME SYNCHRONIZED RESIDUAL RADAR

(75) Inventor: Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/624,045

(22) Filed: Jan. 17, 2007

(65) Prior Publication Data

US 2008/0170559 A1 Jul. 17, 2008

(51) Int. Cl.
*G01S 13/06* (2006.01)
*G01S 5/02* (2006.01)
*G01S 13/00* (2006.01)

(52) U.S. Cl. .................... 342/59; 342/21; 342/118; 342/125; 342/175; 342/195; 342/450; 342/451; 342/463

(58) Field of Classification Search ............ 342/22, 342/27, 28, 52–59, 118, 175, 195, 29–51, 342/450–465, 21, 125, 127, 134–145; 455/403, 455/404.1, 404.2, 422.1, 436, 440, 456.1–457

See application file for complete search history.

(56) References Cited

U.S. PATENT DOCUMENTS

| | | | | |
|---|---|---|---|---|
| 5,485,163 A * | 1/1996 | Singer et al. | ................ | 342/457 |
| 5,508,708 A * | 4/1996 | Ghosh et al. | ................ | 342/457 |
| 5,512,908 A * | 4/1996 | Herrick | ................... | 455/456.5 |
| 5,926,765 A * | 7/1999 | Sasaki | ..................... | 455/456.1 |
| 5,952,969 A * | 9/1999 | Hagerman et al. | .......... | 342/457 |
| 5,973,643 A * | 10/1999 | Hawkes et al. | ............. | 342/457 |
| 6,006,097 A * | 12/1999 | Hornfeldt et al. | ........ | 455/456.2 |
| 6,011,974 A * | 1/2000 | Cedervall et al. | ........ | 455/456.4 |
| 6,031,490 A * | 2/2000 | Forssen et al. | ............. | 342/457 |
| 6,034,635 A * | 3/2000 | Gilhousen | ................... | 342/457 |
| 6,052,597 A * | 4/2000 | Ekstrom | .................. | 455/456.3 |
| 6,061,021 A * | 5/2000 | Zibell | ......................... | 342/457 |
| 6,084,547 A * | 7/2000 | Sanderford et al. | ......... | 342/457 |
| 6,108,553 A * | 8/2000 | Silventoinen et al. | .... | 455/456.3 |
| 6,121,928 A * | 9/2000 | Sheynblat et al. | .......... | 342/463 |
| 6,127,945 A * | 10/2000 | Mura-Smith | ............... | 342/457 |
| 6,167,276 A * | 12/2000 | Pite | ....................... | 455/456.3 |
| 6,169,497 B1 * | 1/2001 | Robert | ....................... | 342/457 |

(Continued)

FOREIGN PATENT DOCUMENTS

JP         4023644 A        1/1992

OTHER PUBLICATIONS

Barrett, Terence, "History of Wideband (UWB) Radar & Communications: Pioneers and Innovators".

(Continued)

*Primary Examiner*—Bernarr E Gregory
(74) *Attorney, Agent, or Firm*—Fogg & Powers LLC

(57) ABSTRACT

A method of using a wireless communication system to determine locations is provided. The method including exchanging communication frames between at least two synchronized nodes in the communication system, wherein each communication frame includes at least one of data signals and radar signals. Determining distances of at least one of nodes and reflective sources based in least in part on at least one of direct and reflected radar signals and determining locations of at least one of the nodes and the reflective sources based on the determined distances.

20 Claims, 18 Drawing Sheets

U.S. PATENT DOCUMENTS

| | | | |
|---|---|---|---|
| 6,172,644 B1* | 1/2001 | Stilp ........................ 342/457 |
| 6,188,354 B1* | 2/2001 | Soliman et al. ............ 342/457 |
| 6,195,046 B1* | 2/2001 | Gilhousen .................. 342/457 |
| 6,243,587 B1* | 6/2001 | Dent et al. ............... 455/456.2 |
| 6,243,588 B1* | 6/2001 | Koorapaty et al. ....... 455/456.2 |
| 6,249,253 B1* | 6/2001 | Nielsen et al. ............. 342/463 |
| 6,256,505 B1* | 7/2001 | Kingdon et al. .......... 455/456.2 |
| 6,275,705 B1* | 8/2001 | Drane et al. ............. 455/456.2 |
| 6,282,427 B1* | 8/2001 | Larsson et al. ........... 455/456.2 |
| 6,285,321 B1* | 9/2001 | Stilp et al. ................. 342/465 |
| 6,292,516 B1 | 9/2001 | Petsko et al. |
| 6,321,091 B1* | 11/2001 | Holland ..................... 342/457 |
| 6,330,452 B1* | 12/2001 | Fattouche et al. ........ 455/456.1 |
| 6,331,825 B1* | 12/2001 | Ladner et al. ............. 342/457 |
| 6,342,854 B1* | 1/2002 | Duffett-Smith et al. ..... 342/457 |
| 6,347,228 B1* | 2/2002 | Ludden et al. .......... 455/456.5 |
| 6,381,464 B1* | 4/2002 | Vannucci .................. 455/456.1 |
| 6,404,388 B1* | 6/2002 | Sollenberger et al. ....... 342/457 |
| 6,421,009 B2* | 7/2002 | Suprunov .................. 342/465 |
| 6,593,883 B2* | 7/2003 | Johnson et al. ............ 342/465 |
| 6,611,233 B2* | 8/2003 | Kimura ..................... 342/458 |
| 6,822,951 B1 | 11/2004 | Patton |
| 7,050,815 B2* | 5/2006 | I'Anson et al. .......... 455/456.1 |
| 2001/0040702 A1 | 11/2001 | Leung |
| 2001/0041576 A1* | 11/2001 | I'Anson et al. ............ 342/450 |
| 2002/0027896 A1 | 3/2002 | Hughes et al. |
| 2003/0198212 A1 | 10/2003 | Hoctor et al. |
| 2005/0026563 A1 | 2/2005 | Leeper et al. |
| 2005/0063328 A1 | 3/2005 | Dunagan et al. |
| 2005/0271150 A1 | 12/2005 | Moore et al. |
| 2005/0276319 A1 | 12/2005 | Akiyama et al. |
| 2006/0187909 A1 | 8/2006 | Sho et al. |
| 2006/0291537 A1 | 12/2006 | Fullerton et al. |

OTHER PUBLICATIONS

Fontana, Robert J., "A Brief History of UWB Communications", , Publisher: Multispectral Solutions, Inc.

Girod, Lewis, "Localization", , Publisher: Distributed Embedded Systems.

"802.15.3 MAC layer Overview and Proposed Enhancements to Support UWB PHY", , Publisher: Mobile and Portable Radio Research Group, Virgina Tech, Published in.

Lee, K.K., "UWB Overview", , p. 80.

Pomalaza-Raez, Carlos et al., "A Unified Approach to Dynamic TDMA Slot Assignment and to Distributed Routing for Multi-Hop Packet Radio Networks".

Somayazulu, V. Srinivasa et al., "Design Challenges for Very High Data Rate UWB Systems", , Publisher: Intel Labs, Published in: Hillsboro, OR.

Webb, Warren, "Ultrawideband: An Electronic Free Lunch?", Dec. 21, 2000, pp. 85-92, Publisher: EDN, Published in: US.

Young, C. David, "USAP Multiple: Dynamic Resource Allocation for Mobile Multihop Multichannel Wireless Networking", , pp. 1-5, Publisher: IEEE.

* cited by examiner

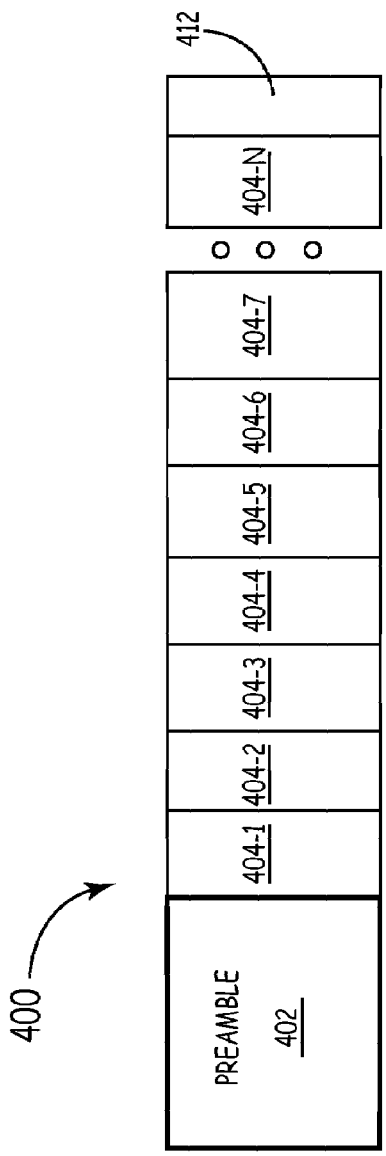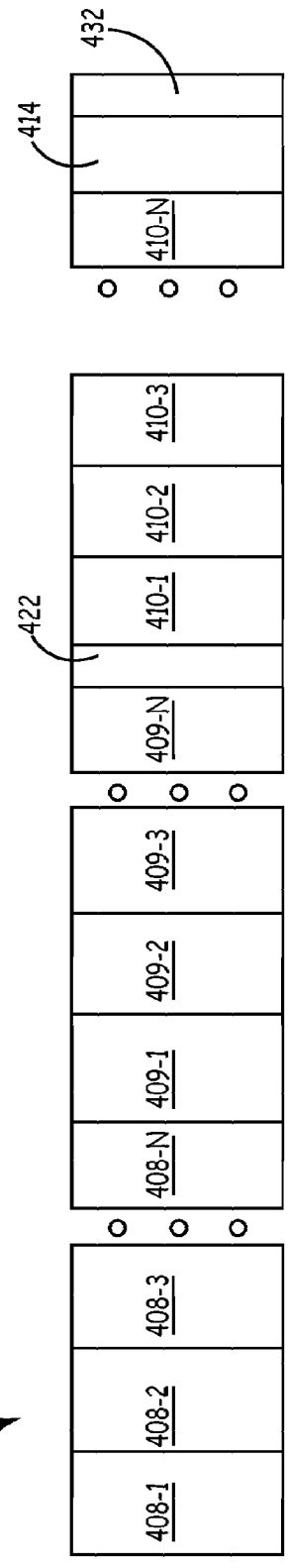
FIG. 4A
FIG. 4B

SUB-FRAME SYNCHRONIZED RESIDUAL RADAR

RELATED APPLICATIONS

The present invention relates to the following commonly assigned patent applications; patent application entitled "Sub-Frame Synchronized Signaling" having Ser. No. 11/181,281 filed on Jul. 14, 2005; patent application entitled "Sub-Frame Synchronized Multiplexing having Ser. No. 11/320,089 filed on Dec. 28, 2005; patent application entitled "Sub-Frame Synchronized Ranging" having Ser. No. 11/380,252 filed on Apr. 26, 2006; and patent application entitled "Sub-Frame Residual Ranging" having Ser. No. 11/468,462 filed on Aug. 30, 2006. Each of the aforementioned related applications is hereby incorporated in their entirety by reference into this application.

BACKGROUND

Radar systems may be used for a variety of purposes, including; detection, tracking and imaging of one or more targets. Common to conventional radar systems are the ability to generate a radio frequency (RF) signal pulse with short time duration, reception of the return signal due to the pulse being reflected by a target(s), and an antenna for directing the RF pulse in a known direction, and receiving the return signal from a known direction.

Most radar systems are mono-static, the antenna for transmitting the RF pulse and receiving the return signal from the target(s) is either the same antenna, or two co-located antennas. Multi-static radar systems typically employ one or more pulse transmitters, and multiple return signal receivers, all of which are geographically dispersed. The separation distances between components in a multi-static radar system is a function of the desired detection range and angular resolution of return signals from distinct targets, or multiple targets which are closely grouped.

Further, the resolution and accuracy of a multi-static radar system is determined by how closely the components are time-synchronized. The need for time-synchronization is inherent in the ranging aspect of radar, to determine the distance between the receiving antenna and the target(s). Hence, in a multi-static radar system the receivers must be time-synchronized with the pulse transmitter(s) in order to accurately measure the overall time of flight (ToF) of the pulse, from the transmitter, to the target and back to the receiver.

Some multi-static radar systems employ wired connections between components for the purpose of distributing a time-synchronizing signal. Other multi-static radar systems employ a wireless link to convey such a signal with a modulated carrier frequency for the same purpose. Both of these methods achieve an accuracy of time-resolution that is limited by the modulation scheme, distribution method, and subsequent signal dispersion.

Conventional multi-static radar systems also rely on directional antennas, each of which has a known orientation in azimuth and elevation at both the transmitter and receiver. The azimuth and elevation information is required to determine the direction for transmitting a pulse, and the direction from which a return signal from a target(s) was received.

In addition to the azimuth and elevation information about the antenna(s), a multi-static radar system may also rely on geographical coordinates of each antenna as well, to determine the absolute location for each target(s).

There exists a class of multi-static radar applications for which many of the typical characteristics are either not present, or not readily available. In particular, wireless sensor networks might be composed of two or more physically small nodes, each having both a data communications and radar capability. Further, each node may have an arbitrary physical location and antenna orientation, resulting from the manner in which the nodes are emplaced. Due to the ad hoc, or unpredictable, relationship between nodes in such a wireless sensor network, certain approaches must be taken to ensure the sensor network is able to achieve data communications between and among nodes, and the multi-static radar capability is operational.

In particular, due to the variable orientation of each sensor node, relative to other nodes, an omni-directional or isotropic antenna is required for data communications. Further, each sensor node is typically battery-powered, and must use energy in the most efficient manner possible in order to achieve a useful lifespan. The limited energy available from a battery typically requires the sensor nodes to use relatively low-power radios for data communications and the multi-static radar function. Hence, the lower-power radio propagation range results in physical separation distances between nodes that is typically less than for a conventional multi-static radar system.

In order to detect, track and image target(s) in a given region, multiple sensor nodes may need to collaborate, which requires close time-synchronization. Further, energy efficiency can be improved by using a single radio for both the data communications and radar functions.

A typical wireless communication system is composed of two or more transmitter/receiver nodes adapted to communicate with each other. Communication systems, such as cell phone systems, use frequency, time and code division multiplexing to ensure only a single transmitter is active at any given instant in time (i.e. for a given set of frequencies and codes). To accomplish a message exchange between nodes, each node is adapted to selectively switch between transmit and receive modes by local node control.

Wireless data communications systems, such as conventional radio frequency systems, provide data communications by modulating, or coding, data signals onto a carrier frequency(s). However, other types of wireless communication systems are carrier-less and rely on time-based coding for data communications. One such communication system that relies on time-based coding to achieve reliable data communications is Ultra Wide Band ("UWB").

These UWB systems, unlike conventional radio frequency communications technology, do not use modulated carrier frequencies to transport data. Instead, UWB systems make use of a wide band energy pulse that transports data using both time-based coding and signal polarization. Time-based coding methods include pulse-position, pulse-rate or pulse-width techniques. UWB communication systems do not provide a common clock to the transmitting and receiving nodes. Instead, a low-drift clock is implemented in each transmitter/receiver node, providing a local reference for time-based coding and decoding. Each of these multiple clock domains is subject to short-term time drift, which will exceed the necessary tolerance for accurate UWB data communication system operation after a predictable time period. As a result, precise time-synchronization between the transmitting node and receiving node(s) is imperative in UWB systems to obtain accurate data communications. In order to precisely synchronize receiving node(s) with a transmitting node, UWB systems typically require preambles for each transmitted data frame. However, some applications with potential to benefit from UWB technology cannot be implemented if a preamble is required for each phase of the application. Also, many potential applications for UWB technology are size and energy constrained, such as networks of wireless sensors and controls, which seek to minimize transmission time and to conserve energy.

Existing applications employing UWB technology vary from short-range mono-static radar systems to high speed wireless communications characterized by large amounts of data requiring isochronous signaling, such as real-time voice and video. The signal used for a UWB application providing data communication requires a preamble at the beginning of each transmitted data frame to enable a receiver(s) to synchronize with the time-based coding being transmitted. For successful data communications, the participating nodes must remain in time-synchronization, leaving unused the residual time period during which the nodes retain time-synchronization following initial data communications. Also, the energy consumed to transmit the preamble for existing applications is a significant fraction of the overall energy required to transmit the preamble and subsequent data.

For the reasons stated above, and for other reasons stated below which will become apparent to those skilled in the art upon reading and understanding the present specification, there is a need in the communication industries for a method to provide collaboration among two or more transmitter/receiver nodes that utilizes the residual period of a clock synchronization mechanism required for time-synchronous communication systems, for multiple purposes, including data communication and multi-static radar applications.

The above-mentioned problems of current wireless communication systems are addressed by embodiments of the present invention and will be understood by reading and studying the following summary and specification. The following summary is made by way of example and not by way of limitation. It is merely provided to aid the reader in understanding some of the aspects of the invention. In one embodiment a method of using a wireless communication system to determine locations is provided. The method includes exchanging communication frames between at least two synchronized nodes in the communication system, wherein each communication frame includes at least one of data signals and radar signals. Determining distances of at least one of nodes and reflective sources based in least in part on at least one of direct and reflected radar signals and determining locations of at least one of the nodes and the reflective sources based on the determined distances.

SUMMARY

The above-mentioned problems of current wireless communication systems are addressed by embodiments of the present invention and will be understood by reading and studying the following summary and specification. The following summary is made by way of example and not by way of limitation. It is merely provided to aid the reader in understanding some of the aspects of the invention. In one embodiment a method of using a wireless communication system to determine locations is provided. The method includes exchanging communication frames between at least two synchronized nodes in the communication system, wherein each communication frame includes at least one of data signals and radar signals. Determining distances of at least one of nodes and reflective sources based in least in part on at least one of direct and reflected radar signals and determining locations of at least one of the nodes and the reflective sources based on the determined distances.

DRAWINGS

The present invention can be more easily understood and further advantages and uses thereof more readily apparent, when considered in view of the description of the preferred embodiments and the following figures in which:

FIG. 4A is an initial communication sub-frame of one embodiment of the present invention;

FIG. 4B is an application sub-frame signal of one embodiment of the present application;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems for efficiently using time-synchronized wireless communications systems for data communication as well as ranging applications, such as radar. The present invention is related to the Sub-Frame Synchronized Signaling application Ser. No. 11/181/281 filed on Jul. 14, 2005 (the '281 application), Sub-Frame Synchronized Multiplexing application Ser. No. 11/320,089 filed on Dec. 12, 2005 (the '089 application), Sub-Frame Synchronized Ranging application Ser. No. 11/380,252 filed on Apr. 26, 2006 (the '252 application) and Sub-Frame Synchronized Residual Ranging application Ser. No. 11/468,462 filed on Aug. 30, 2006 (the '462 application), all of which are herein incorporated by reference. The Sub-Frame Synchronized Signaling application provided methods and apparatus, such as switch points and sub-frame duplexing, for sub-frame synchronized signaling that avoids many of the long resynchronization periods caused by preambles at the start of each transmission frame. The Sub-Frame Synchronized Multiplexing application provided methods and apparatus for utilizing the residual time-synchronization period for signaling and communications. The Sub-Frame Synchronized Ranging application provides methods and apparatus for measuring the distance between cooperating nodes. The Sub-Frame Synchronized Residual Ranging application provides methods and apparatus for measuring the distance between cooperating nodes during the residual time-synchronization period.

Figure 1A:
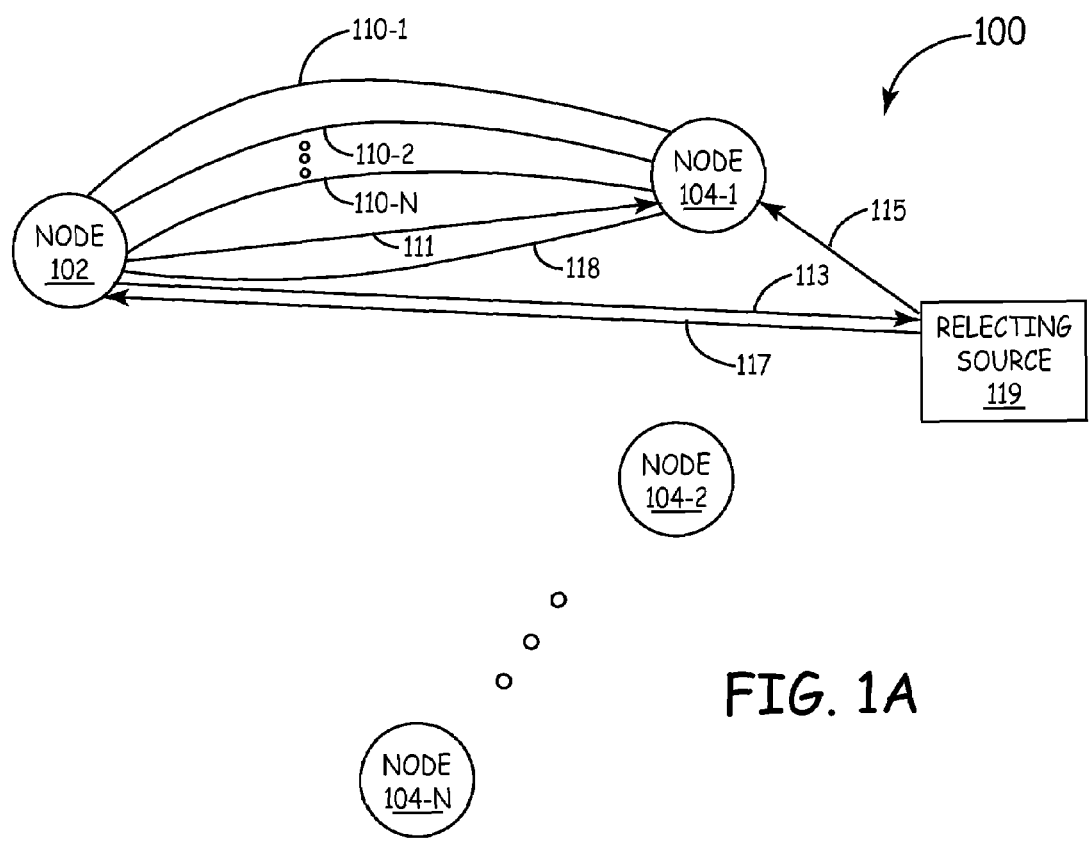
FIG. 1A is a diagram of one embodiment of a communications system of the present invention.

In FIG. 1A, one embodiment of a wireless data communications system 100 of the present invention is illustrated. In this embodiment, the wireless data communication system 100 includes communication node 102 and communication nodes 104-1 through 104-N. The wireless communication nodes 102 and 104-1 though 104-N are adapted to communicate with each other. In particular, in the embodiment illustrated in FIG. 1A, initial transmitting communication node 102 is in communication with communication nodes 104-1 through 104-N. However, it will be understood that the present invention can generally apply to two or more communication nodes, any of which may be the initial transmitting node. In embodiments of the present invention, an initial communication node initiates a message exchange which may include, but is not limited to, a frame preamble, schedule(s), data communications and application-specific signaling. A message exchange is started when communication node 102 transmits an initial communication signal that contains a preamble. The preamble is a known sequence of information that includes information regarding clock timing. Each receiving node uses the information in the preamble to synchronize its local clock so communication between the transmitting node and the receiving nodes can occur. In embodiments of the present invention, communication between nodes is maintained without sending an additional preamble while the internal clocks in the respective nodes remain adequately synchronized for either data communications or application-specific signaling.

Referring back to FIG. 1A, the wireless data communications system 100 is a point to point communications system in which only two nodes are participating at a time, nodes 102 and 104-1. The first data communication signal 110-1 containing the frame preamble and other data to be exchanged are illustrated. The first data communication signal may be referred to as synchronization communication signal or initial signal. Node 102 is the transmitting node when transmitting signal 110-1, and node 104-1 is the receiving node. For communications signals 110-2 through 110-N, either node 102 or 104-1 may be the transmitting node, and the remaining node is the receiving node, as determined by the two nodes. At the end of each communication signal is an indication that the signal is complete. In one embodiment, this is referred to a switch point. The switch point provides a signal to the nodes indicating whether the signaling mode is to change direction or purpose. For a change of signaling direction, a designated receiving node becomes a transmitting node to transmit a communication signal and the remaining node(s) perform a sub-frame duplex to receiving mode. An example of this is signal 110-2 transmitted from node 104-1 back to node 102, which has changed to the receive mode. The data communications signals between the nodes continues like this according to a schedule exchanged between the nodes, where such a schedule is designed in a manner to ensure the communications is completed while the local clocks in each communicating node remain in time-synchronization with an accuracy suitable for communications. As those of skill in the art will understand, the format and content of the schedule is system and application-dependent, and is not a limitation of the present invention. During the communications frame following the synchronization initiated by node 102, the last communication signal prior to the switch point for the ranging application between nodes 102 and 104-1 is illustrated as signal 110-N in FIG. 1A.

In response to the switch point, the nodes change into an application-specific mode of operation, such as a multi-static radar system. Node 102, as the initiating node for the current communications frame, provides the time-synchronization reference in the frame preamble in the initial communications 110-1, which other cooperating nodes such as 104-1 use to synchronize a local clock in node 104-1 with a similar local clock in node 102. In accordance with the current schedule, node 102 transmits one or more ranging (or radar) signals 111. Also in accordance with the current schedule node 104-1 receives the ranging signals 111 and measures the Time-of-Flight (ToF) based on the scheduled time of transmission by node 102. Such ranging signals 111 also propagate as ranging signal 113 and may reflect from objects and surfaces such as 119. Such reflected signals may be received by both node 104-1 as signal 115 and node 102 as signal 117 during the period of time scheduled for performing such ToF measurements. The ToF for each of the reflected signals, such as signals 113 plus 115 and 113 plus 117 may be measured by nodes 104-1 and 102, respectively. As will be understood by those of skill in the art, the number of reflected signals received by nodes 102 and 104-1 may vary from none to many, and the number of reflections is not a limitation of the present invention. Each node may further process the ToF measurements in an application-specific manner prior to exchanging selected ToF data in communications signals 118. As determined by the schedule, the data exchange may be uni-directional or bi-directional, without limitation. Further, the communications signals 118 may occur either during the current time-synchronized frame, or as a part of the communications following a subsequent frame preamble of the kind described by 110-1 through 110-N. Subsequent to the data exchange, one or both participating nodes, such as node 102 and node 104-1, may determine the distances between node 102, node 104-1 and a reflecting source such as 119, based on the ToF measurement for transmitted signal 111 and propagating signal 113. The distance between node 102 and a reflecting source 119 may be determined as one-half the total ToF for signals 113 plus 117. Finally, the distance between node 104-1 and a reflecting source 119 may be determined as the ToF of signal 113 plus the ToF of signal 115, minus the distance between node 102 and a reflecting source 119. The ToF for signals 111, 113 and 115, whether measured or computed, is proportional to the respective distances between pairs of these entities and may be used to determine the location of a reflecting source 119. With only two nodes participating in the location determination a reflecting source 119 will have two apparent locations, due to symmetry of the location of node 104-1 about the path of signal 113 from node 102 to reflecting source 119. To resolve the ambiguity of the location of a reflecting source 119, at least three nodes must participate in the location determination of a reflecting source 119.

Figure 1B:
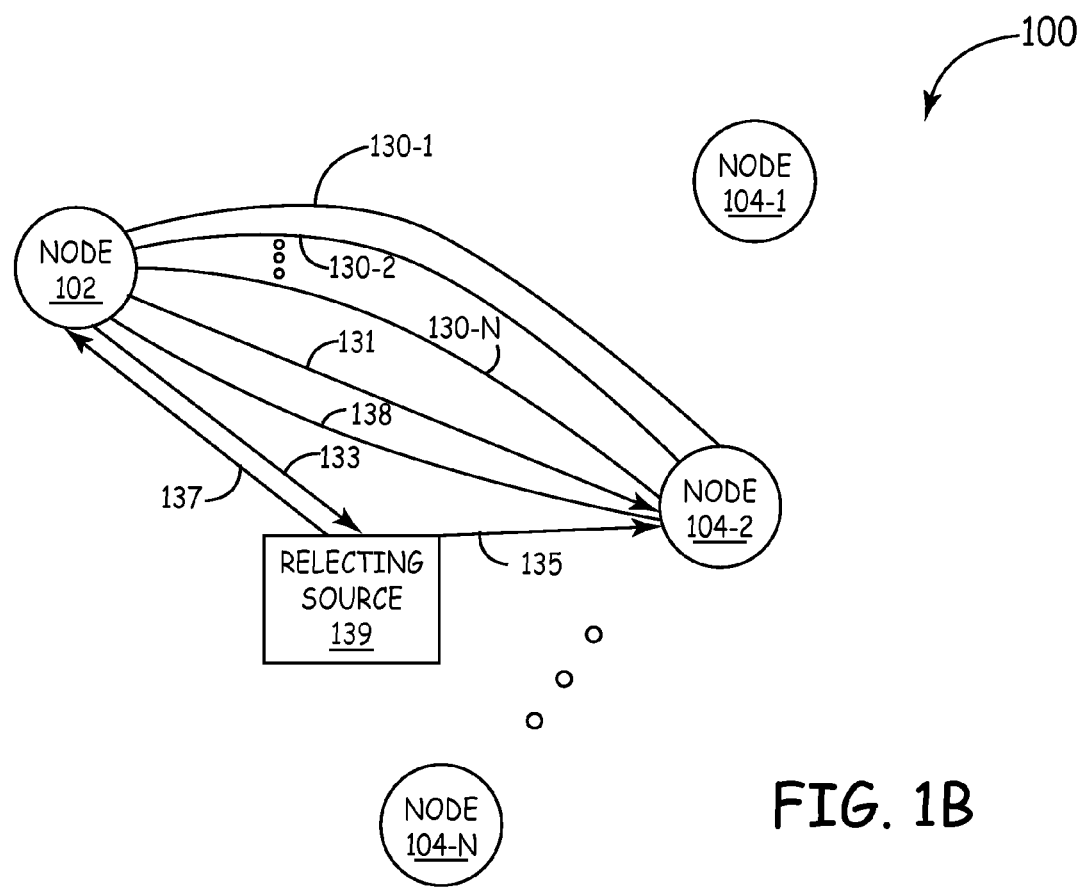
FIG. 1B is a diagram of another embodiment of a communication system of the present invention.

In FIG. 1B, the wireless data communications system 100 of FIG. 1A is a point to point communications system with two different nodes participating at a time, nodes 102 and 104-2. The first data communication signal 130-1 containing the frame preamble and other data to be exchanged are illustrated. The first data communication signal may be referred to as synchronization communication signal or initial signal. Node 102 is the transmitting node when transmitting signal 130-1, and node 104-2 is the receiving node. For communications signals 130-2 through 130-N, either node 102 or 104-2 may be the transmitting node, and the remaining node is the receiving node, as determined by the two nodes. At the end of each communication signal is an indication that the signal is complete. In one embodiment, this is referred to a switch point. The switch point provides a signal to the nodes indicating whether the signaling mode is to change direction or purpose. For a change of signaling direction, a designated receiving node becomes a transmitting node to transmit a communication signal and the remaining node(s) perform a sub-frame duplex to receiving mode. An example of this is signal 130-2 transmitted from node 104-2 back to node 102, which has changed to the receive mode. The data communications signals between the nodes continues like this according to a schedule exchanged between the nodes, where such a schedule is designed in a manner to ensure the communications is completed while the local clocks in each communicating node remain in time-synchronization with an accuracy suitable for communications. During the communications frame following the synchronization initiated by node 102, the last communication signal prior to the switch point for the ranging application between nodes 102 and 104-2 is illustrated as signal 130-N in FIG. 1B.

In response to the switch point, the nodes change into an application-specific mode of operation, such as a multi-static radar system. Node 102, as the initiating node for the current communications frame, provides the time-synchronization reference in the frame preamble in the initial communications 130-1, which other cooperating nodes such as 104-2 use to synchronize a local clock in node 104-2 with a similar local clock in node 102. In accordance with the current schedule, node 102 transmits one or more ranging signals 131. Also in accordance with the current schedule node 104-2 receives the ranging signals 131 and measures the Time-of-Flight (ToF) based on the scheduled time of transmission by node 102. Such ranging signals 131 also propagate as ranging signal 133 and may reflect from objects and surfaces such as 139. Such reflected signals may be received by both node 104-2 as signal 135 and node 102 as signal 137 during the period of time scheduled for performing such ToF measurements. The ToF for each of the reflected signals, such as signals 133 plus 135 and 133 plus 137 may be measured by nodes 104-2 and 102, respectively. As will be understood by those of skill in the art, the number of reflected signals received by nodes 102 and 104-2 may vary from none to many, and the number of reflections is not a limitation of the present invention. Each node may further process the ToF measurements in an application-specific manner prior to exchanging selected ToF data in communications signals 138. As determined by the schedule, the data exchange may be uni-directional or bi-directional, without limitation. Further, the communications signals 138 may occur either during the current time-synchronized frame, or as a part of the communications following a subsequent frame preamble of the kind described by 130-1 through 130-N.

Subsequent to the data exchange, one or both participating nodes, such as node 102 and node 104-2, may determine the distances between node 102, node 104-2 and a reflecting source such as 139, based on the ToF measurement for transmitted signal 131 and propagating signal 133. The distance between node 102 and a reflecting source 139 may be determined as one-half the total ToF for signals 133 plus 137. Finally, the distance between node 104-2 and a reflecting source 139 may be determined as the ToF of signal 133 plus the ToF of signal 135, minus the distance between node 102 and reflecting source 139. The ToF for signals 131, 133 and 135, whether measured or computed, is proportional to the respective distances between pairs of these entities and may be used to determine the location of a reflecting source 139. With only two nodes participating in the location determination a reflecting source 139 will have two apparent locations, due to symmetry of the location of node 104-2 about the path of signal 133 from node 102 to a reflecting source 139. To resolve the ambiguity of the location of a reflecting source 139, at least three nodes must participate in the location determination of a reflecting source 139. In a point to point wireless communications system 100, at least two pairs of nodes are required to involve the necessary three nodes. A first pair, such as node 102 and 104-1, and a second pair, such as node 102 and 104-2, perform the radar application one pair of nodes at a time, with node 102 resolving the ambiguity of location for reflecting sources such as 119 and 139 using information exchanged among node 102 and nodes 104-1 and 104-2.

Figure 1C:
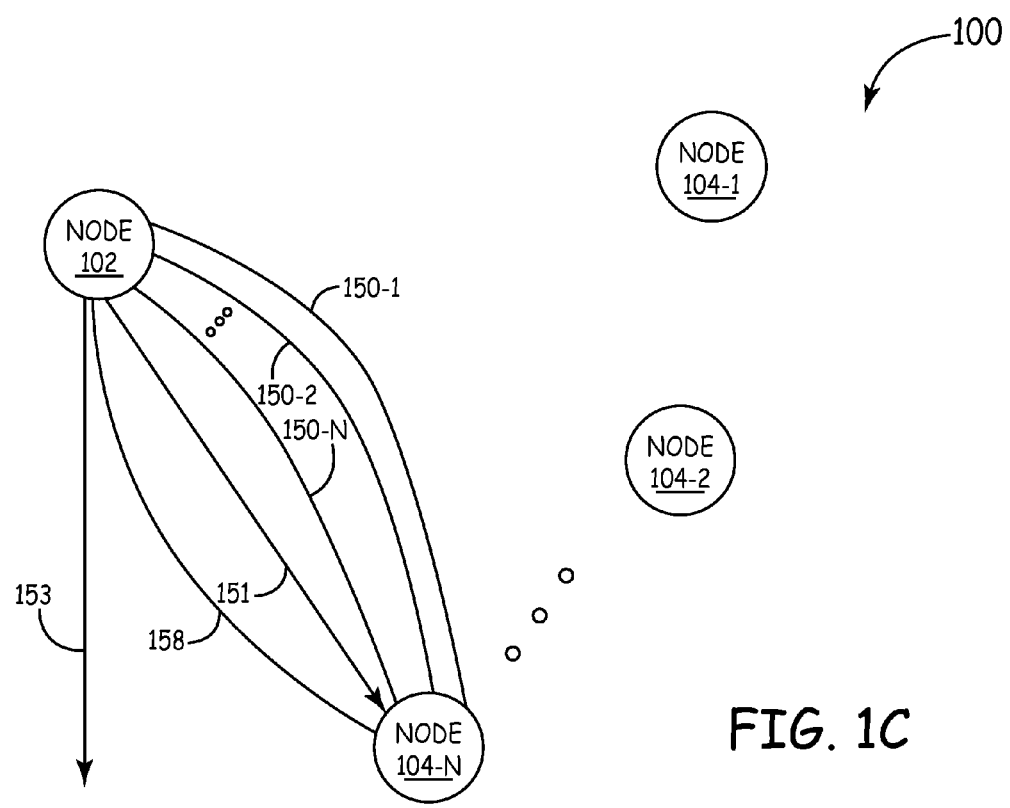
FIG. 1C is a diagram of another embodiment of a communications system of the present invention.

In FIG. 1C, the wireless data communications system 100 of FIG. 1A is a point to point communications system with two different nodes participating at a time, nodes 102 and 104-N. The first data communication signal 150-1 containing the frame preamble and other data to be exchanged are illustrated. The first data communication signal may be referred to as synchronization communication signal or initial signal. Node 102 is the transmitting node when transmitting signal 150-1, and node 104-N is the receiving node. For communications signals 150-2 through 150-N, either node 102 or 104-N may be the transmitting node, and the remaining node is the receiving node, as determined by the two nodes. At the end of each communication signal is an indication that the signal is complete. In one embodiment, this is referred to a switch point. The switch point provides a signal to the nodes indicating whether the signaling mode is to change direction or purpose. For a change of signaling direction, a designated receiving node becomes a transmitting node to transmit a communication signal and the remaining node(s) perform a sub-frame duplex to receiving mode. An example of this is signal 150-2 transmitted from node 104-N back to node 102, which has changed to the receive mode. The data communications signals between the nodes continues like this according to a schedule exchanged between the nodes, where such a schedule is designed in a manner to ensure the communications is completed while the local clocks in each communicating node remain in time-synchronization with an accuracy suitable for communications. During the communications frame following the synchronization initiated by node 102, the last communication signal prior to the switch point for the ranging application between nodes 102 and 104-N is illustrated as signal 150-N in FIG. 1C.

In response to the switch point, the nodes change into an application-specific mode of operation, such as a multi-static radar system. Node 102, as the initiating node for the current communications frame, provides the time-synchronization reference in the frame preamble in the initial communications 150-1, which other cooperating nodes such as 104-N use to synchronize a local clock in node 104-N with a similar local clock in node 102. In accordance with the current schedule, node 102 transmits one or more ranging signals 151. Also in accordance with the current schedule node 104-N receives the ranging signals 151 and measures the Time-of-Flight (ToF) based on the scheduled time of transmission by node 102. Such ranging signals 151 also propagate as ranging signal 153 and may reflect from objects and surfaces. As will be understood by those of skill in the art, the number of reflected signals received by nodes 102 and 104-N may vary from none to many, and the number of reflections is not a limitation of the present invention. Each node may further process the ToF measurements in an application-specific manner prior to exchanging selected ToF data in communications signals 158. As determined by the schedule, the data exchange may be uni-directional or bi-directional, without limitation. Further, the communications signals 138 may occur either during the current time-synchronized frame, or as a part of the communications following a subsequent frame preamble of the kind described by 150-1 through 150-N.

Figure 1D:
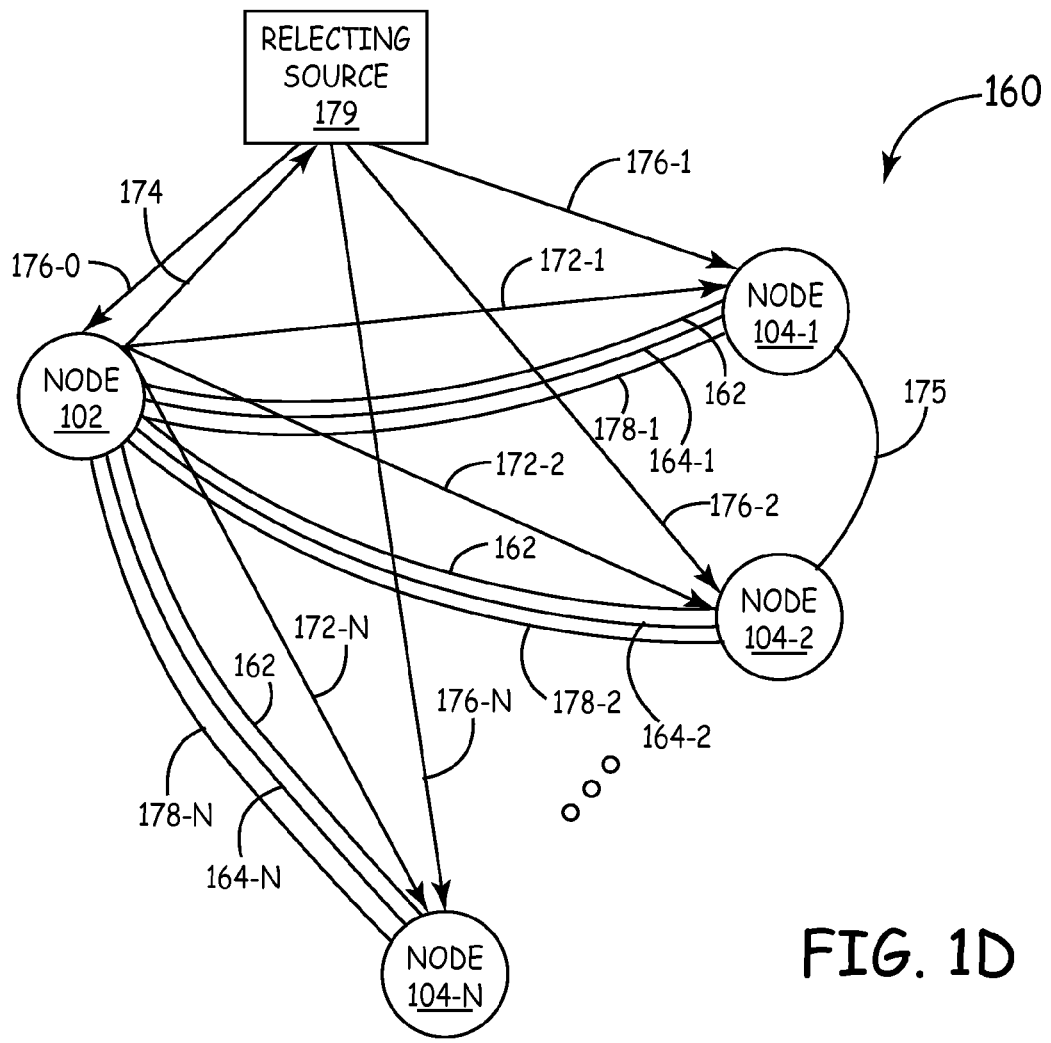
FIG. 1D is a diagram of another embodiment of a communications system of the present invention.

Subsequent to the data exchange, one or both participating nodes, such as node 102 and node 104-N, may determine the distance between node 102, node 104-N and determine there were no other reflecting signals received by node 102 or node 104-N during the scheduled period for receiving such reflected signals. In one embodiment, the wireless data communication system is a point to point communication system with only two nodes participating at a time. An example of this system in reference to the communication system 100 of FIG. 1A is when node 102 sends a first signal 110-1 to node 104-1 and then a second signal 130-1 at a later time to node 104-2 as in FIG. 1B. In another embodiment of the present invention, the data communication system 160 of FIG. 1D is arranged in a broadcast network where a transmitted signal 162 is received by multiple nodes simultaneously. In this embodiment, only a single preamble is required since only one initial transmission signal is sent by node 102 to the multiple nodes 104-1, 104-2 and 104-N. Referring to FIG. 1D, an initial signal 162 including the single preamble is broadcast from node 102 to nodes 104-1 through 104-N simultaneously. At the end of each communication signal is an indication that the signal is complete. In one embodiment, this is referred to a switch point. The switch point provides a signal to the nodes indicating whether the signaling mode is to change direction or purpose. For a change of signaling direction, a designated receiving node becomes a transmitting node to transmit a communication signal and the remaining node(s) perform a sub-frame duplex to receiving mode. An example of this is signal 164-1 transmitted from node 104-1 back to node 102, which has changed to the receive mode. The data communications signals between the nodes continues like this according to a schedule exchanged between the nodes, where such a schedule is designed in a manner to ensure the communications is completed while the local clocks in all communicating nodes remain in time-synchronization with an accuracy suitable for communications. During the communications frame following the synchronization initiated by node 102, the last communication signal prior to the switch point for the ranging application between nodes 102 and 104-N is illustrated as signal 164-N in FIG. 1D.

In response to the switch point, the nodes change into an application-specific mode of operation, such as a multi-static radar system. Node 102, as the initiating node for the current communications frame, provides the time-synchronization reference in the frame preamble in the initial communications 162, which other cooperating nodes such as 104-1 through 104-N use to synchronize a local clock in nodes 104-1 through 104-N with a similar local clock in node 102. In accordance with the current schedule, node 102 transmits one or more ranging signals 172-1 through 172-N. Also in accordance with the current schedule nodes 104-1 through 104-N receive the ranging signals 172-$i$ (wherein i signifies any one or more of the signals 1-N) and measure the Time-of-Flight (ToF) based on the scheduled time of transmission by node 102. Such ranging signals 172-$i$ also propagate as a ranging signal 174 and may reflect from objects and surfaces such as 179. Such reflected signals may be received by node 104-1 as signal 176-1, node 104-2 as signal 176-2, node 104-N as signal 176-N and node 102 as signal 176-0 during the period of time scheduled for performing such ToF measurements. The ToF for each of the reflected signals, such as signals 174 plus 176-0, 174 plus 176-1, 174 plus 176-2 and 174 plus 176-N may be measured by nodes 102, 104-1, 104-2 and 104-N, respectively. In FIG. 1D, nodes 104-$i$ perform the ToF measurements of signals 174 and 176-$i$ in parallel, during the current communications frame, initiated by node 102 with communications 162. As will be understood by those of skill in the art, the number of reflected signals received by nodes 102 and 104-$i$ may vary from none to many, and the number of reflections is not a limitation of the present invention. Each node may further process the ToF measurements in an application-specific manner prior to exchanging selected ToF data in communications signals 178-1 through 178-N. As determined by the schedule, the data exchange may be uni-directional or bi-directional, without limitation. Further, the communications signals 178-$i$ may occur either during the current time-synchronized frame, or as a part of the communications following a subsequent frame preamble of the kind described by communication 162 and communications 164-1 through 164-N.

Subsequent to the data exchange, all participating nodes, such as node 102 and nodes 104-$i$, may determine the distances between node 102, nodes 104-$i$ and a reflecting source such as 179, based on the ToF measurement for transmitted signal 174 and propagating signals 172-$i$ and 176-$i$. The distance between node 102 and a reflecting source 179 may be determined as one-half the total ToF for signals 174 plus 176-0. Similarly, the distances between node 102 and 104-$i$ and a reflecting source 179 may be determined as the ToF of signal 174 plus the ToF of signal 176-$i$, minus the distance between node 102 and reflecting source 179. The ToF for signals 174, 172-$i$ and 176-$i$, whether measured or computed, is proportional to the respective distances between pairs of these entities and may be used to determine the location of a reflecting source 179. With three or more nodes participating in the location determination a unique location for a reflecting source 179 may be determined, relative to node 102.

Figure 1E:
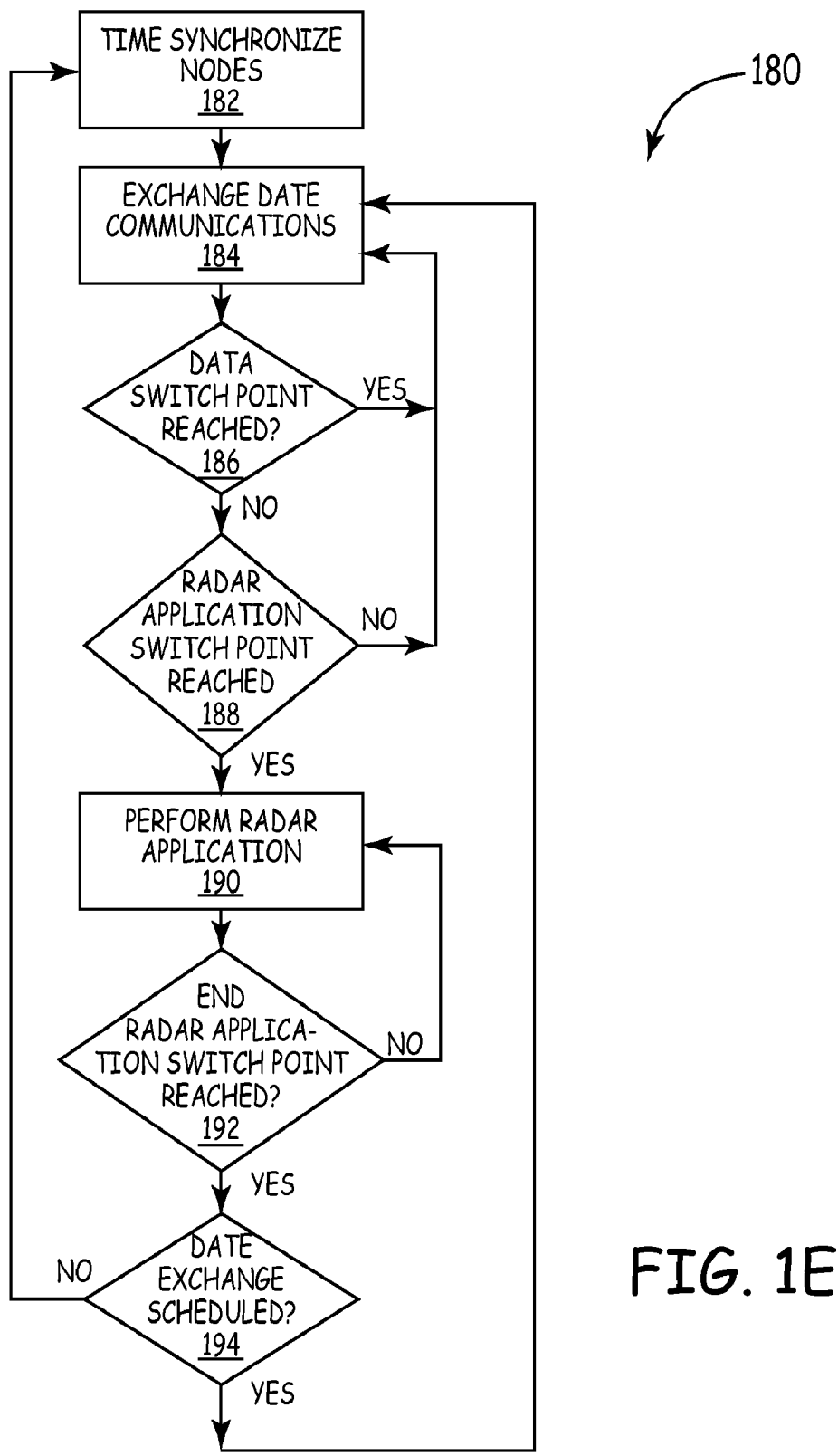
FIG. 1E is a flow diagram of data communication and a radar application between nodes in a communication system of one embodiment of the present invention.

In embodiments of the present invention, communication between nodes is established when a node transmits an initial communications frame containing a synchronization preamble, and maintained without sending an additional preamble while the internal clocks in the respective nodes remain adequately synchronized for either data communications or application-specific signaling. As stated above, following the preamble, data may be exchanged between nodes. The period of time subsequent to the completion of data exchange during which the communicating nodes are still synchronized enough so that the signals can be used for other purposes is called the residual time-synchronization period. Embodiments of the present invention use this residual time-synchronization of the nodes for purposes other than data communication, such as a radar application. The flow diagram 180 of FIG. 1E illustrates the use of the residual time-synchronization period in one embodiment of the present invention. As illustrated, the process starts by synchronizing the nodes in communication (182). Once the nodes are synchronized (182), the nodes exchange data communications (184). After each data exchange (184), a check is made for a data switch point (186). If a data switch point is reached, then the nodes respond according to the data switch point, by performing a sub-frame duplex to change between transmission and reception, as appropriate for each node. If a data switch point is not reached, then a check is made for a radar application switch point (188). If a radar application switch point is reached, then the nodes respond according to a schedule exchanged during the data communications exchange (184). The radar application is then performed (190), also according to a schedule. When the switch point for the end of the radar application is reached (192) a check is made for a scheduled data exchange (194). If another data exchange is scheduled, then the nodes perform a sub-frame duplex as appropriate for each node according to the schedule and continue with data exchange (184). If no further data exchange is scheduled (194), then the process continues with the time-synchronization of nodes for communications (182) as determined by the communicating nodes.

Figure 2:
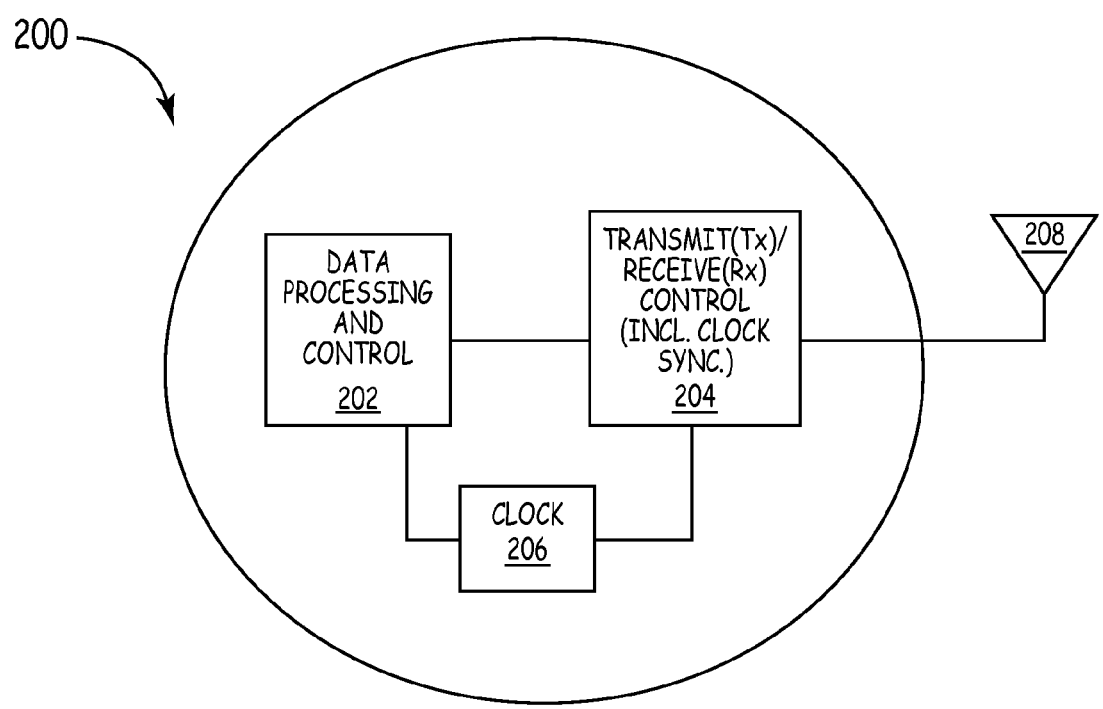
FIG. 2 is communication node of one embodiment of the present invention.

FIG. 2, illustrates one embodiment of a node 200 of the present invention. Node 200 includes a data processing and Ultra-Wide Band (UWB) control circuit 202, a UWB transmit(Tx)/receive(Rx) circuit 204 and a local clock 206. The Tx/Rx circuit 204 includes a clock synchronization circuit. As illustrated the clock 206 is used by both the control circuit 202 and the Tx/Rx circuit 204. The Tx/Rx circuit uses the clock, for among other things, to determine time intervals between data. The control circuit 202 uses the clock among other things, to determine when to send and pass received data. The Tx/Rx circuit uses the antenna 208 to transmit and receive signals used for data communications and other applications, such as a radar application.

Figure 3:
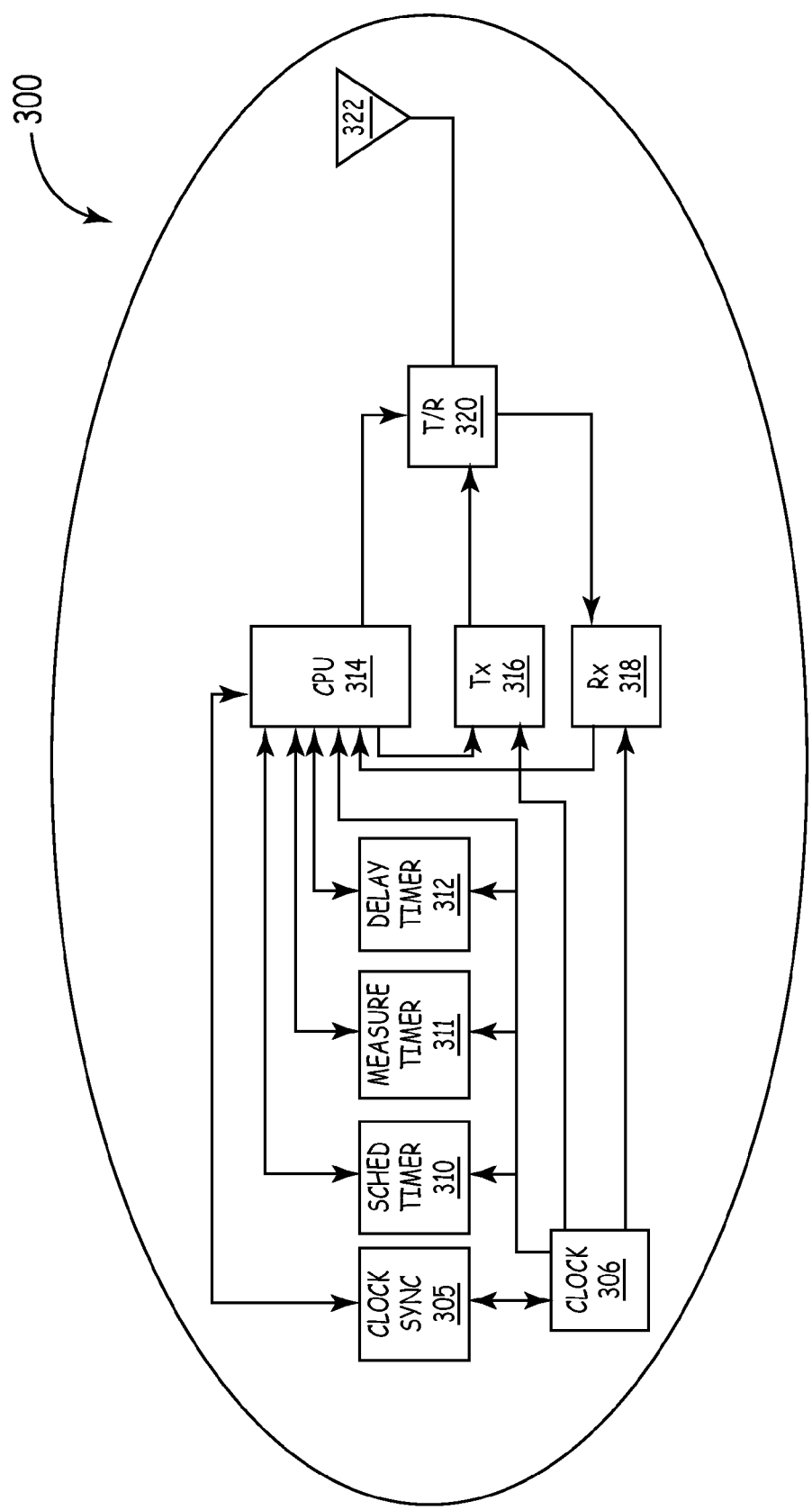
FIG. 3 is a communication node of another embodiment of the present invention.

An example of a more detailed node 300 of one embodiment of the present invention is illustrated in FIG. 3. Node 300 includes an antenna 322, a transmit/receive(T/R) switch 320, a CPU 314, a Tx 316, a Rx 318, a clock synchronization circuit 305 and a local clock 306. The CPU 314 controls the T/R switch 320. When node 300 is transmitting the T/R switch 320 is placed in a transmitting position, and when node 300 is receiving the T/R switch is placed in a receiving position.

The clock synchronization circuit 305 is used to adjust and monitor the local clock 306. In particular, when an initial transmission with a preamble is received through the receiver 318, the synchronization circuit 305 is used to synchronize clock 306 with the clock of the node which sent the initial transmission.

As illustrated in FIG. 3, the clock is further in communication with the transmitter 316 to clock the transmission of data in a transmission signal and with the receiver 318 to clock the receiving of data in a received signal. The CPU is in communication with the transmitter 316 to process data to be transmitted. The CPU 314 is also in communication with the receiver 318 to process data in a received signal. The embodiment of FIG. 3, also includes a timing circuit 311. The timing circuit 311 is used for among other things, to track the time of flight (ToF) of received ranging pulses and reflections of ranging signals. In one embodiment, the timing circuit (or ToF timer) 311 includes a first timer to track the ToF of a direct ranging pulse and a second timer to track the ToF of a reflected ranging (or echo) pulse. The ToF of the pulses are used by the CPU 314 to determine distances ranging pulses have traveled from the transmitting node or a surface or object reflecting such a signal, to a receiving node.

FIG. 3 also illustrates a schedule timer 310 and a delay timer 312 in communication with the local clock 306 and CPU 314. The schedule timer is used by the CPU 314, for among other purposes, to monitor the progress of the current communications and application schedule, such that the CPU 314 properly controls the Tx 316, Rx 318, T/R switch 320, schedule timer 310, measurement timer 311 and delay timer 312. The delay timer 312 is used, for among other purposes, to determine when a specific time period has elapsed related to the schedule Referring to FIG. 4A, an example of an initial signal 400 is illustrated. In particular, the initial signal in this embodiment is an initial communication frame 400. An initial communication frame includes a preamble and a sub-frame containing data bits and a switch point. The initial communication frame 400 is sent from a transmitting node (first node) and includes preamble 402. Preamble 402 contains information used by one or more receiving nodes for synchronization of the receiving node(s) local clock(s). After the preamble, information or data is transmitted. The information or data is generally referenced as 404-1 through 404-N and in one embodiment are data communication bits and may include information such as a schedule for a radar application. Also included in the initial frame of this embodiment is another type of information such as a switch point 412. The switch point 412 indicates the initial data exchange is complete. Moreover, in one embodiment the switch point initiates a link reversal or duplexing. Link reversal or duplexing instructs a particular receiving second node to change into a transmitting node and the transmitting node to change into a receiving node. In particular, in one embodiment, once the transmitting node has encountered a switch point, the transmitting node stops transmission, switches into receive mode and along with all other receiving nodes, adjusts its local clock to reflect the time delay coming back from a communication signal from the particular transmitting node. Further in other embodiments, the switch point 412 may be used to indicate a change in signal format.

FIG. 4B illustrates a second communication sub-frame 401. This second communication sub-frame may be transmitted in part or in whole by the node transmitting the initial communications signal 400, or be transmitted by multiple nodes as determined by the schedule exchanged during the initial communications sub-frame. In one embodiment of the present invention, a second communication sub-frame 401 includes transmitted radar signals 408-1 through 408-N, received radar signals 409-1 through 409-N, a radar application switch point 422, radar application signals 410-1 through 410-N, an optional time delay 414 and an end of radar application switch point 432. As illustrated in FIG. 4B, no preamble is required in this second communication sub-frame because the clocks in the communicating nodes are still time-synchronized. The communication between nodes occurs without the need for additional preambles in the frames, such as frame 401, until the clocks in one or more nodes have drifted far enough out of time-synchronization that useful information (i.e. pulses, application level synchronization instructions and the like) cannot be exchanged. Once synchronization is lost (i.e. beyond the residual time-synchronization period) another initial communication frame with a preamble, similar to preamble 402 of FIG. 4A, is required to resynchronize the respective clocks in the communicating nodes. As those of skill in the art will understand, the maximum time duration during which the communicating nodes remain time-synchronized is determined by the design and implementation of the communicating nodes, especially the circuits and software related to clock synchronization, and the environment in which the nodes are operating. Further, the radar application schedule exchanged during the initial communications sub-frame in the data bits 404-1 through 404-N must be designed to have a duration less than this maximum time-synchronization period, taking into consideration the node specifications, environment, application and number of communicating nodes.

Figure 5:
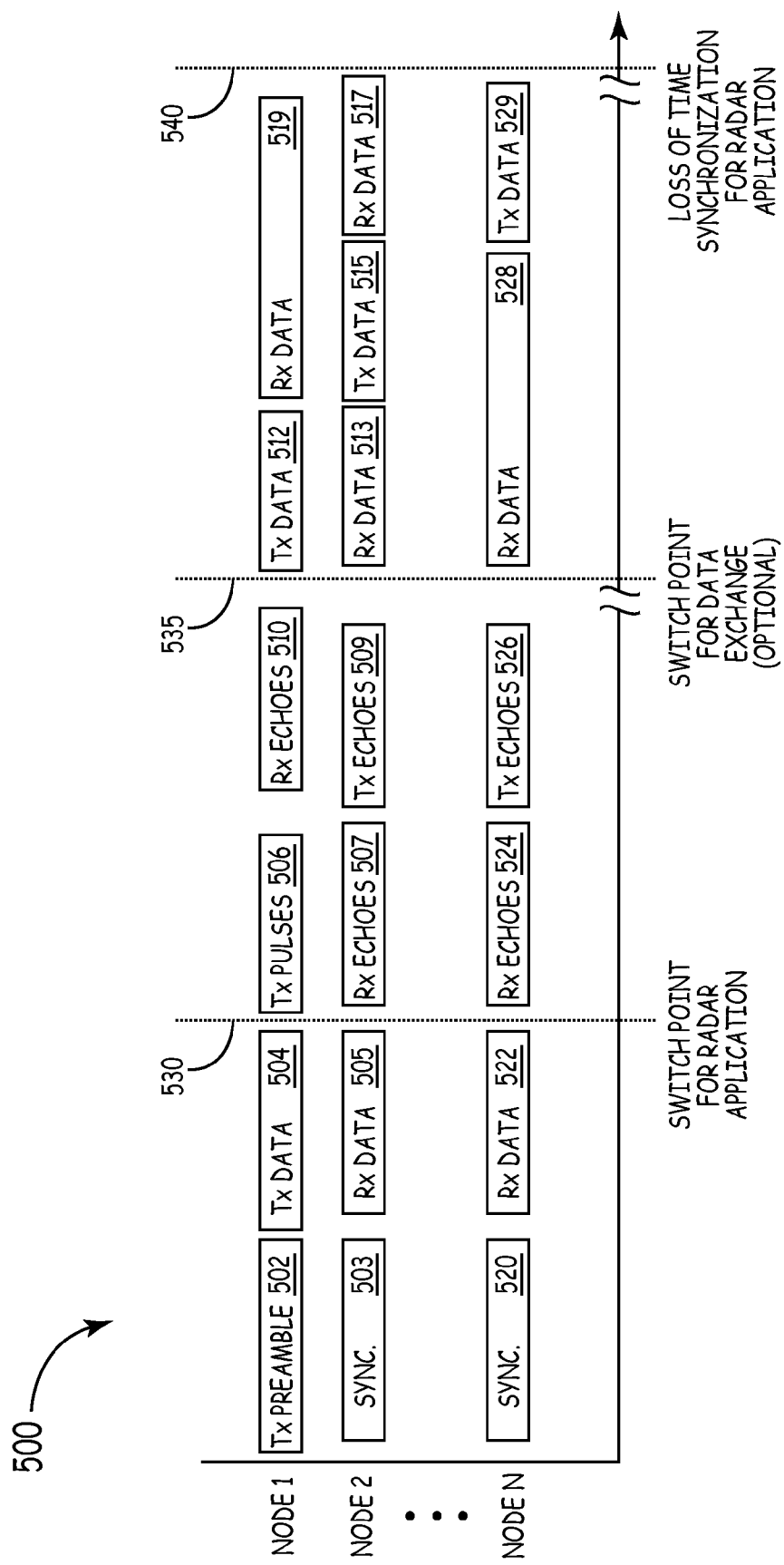
FIG. 5 is a graph illustrating communications and timing of one embodiment of the present invention.

A time sequence of functions performed by the nodes in one embodiment of the present invention is illustrated in graph 500 of FIG. 5. The embodiment of FIG. 5 illustrates the communications signal timing among multiple nodes such as Node 1, Node 2 through Node N. Node 1 initiates a period of time-synchronization among the nodes by transmitting an initial communications signal 502 including a frame preamble. In response to the initial signal with the preamble 502, Node 2 synchronizes its local clock 503 during the preamble. In this example, other nodes in communication with Node 1, represented by Node N, also synchronize their local clocks 520 during the preamble. Data is then transmitted by Node 1 in a sub-frame 504, including but not limited to, data, and schedules for data exchange and radar applications. Node 2 receives the sub-frame data 505. Node N also receives the sub-frame data 522. At switch point 530 all of the nodes change modes from data exchange to radar application, and start appropriate timers in each node. According to a radar application schedule exchanged during a data exchange, such as signal 504 from Node 1, transmits one or more radar signal pulses 506. Also according to the radar application schedule, Node 2 measures the Time-of-Flight (ToF) between the transmission of pulses 506, and reception of the pulses or echoes from reflecting sources 507. Since Node 1 and Nodes 2 have time-synchronized clocks, the ToF measurements are accurate. Other nodes, such as Node N, also measure the ToF of pulses 506 or echoes from reflecting sources 524. According to the radar application schedule, Node 2 changes from receive to transmit mode in order to transmit radar pulses 509. Also according to the radar application schedule Node 1 changes from transmit to receive mode and uses its time-synchronized local clock to measure the ToF between the transmission of pulses 509 and reception of these pulses or echoes from reflecting sources 510. Also according to the radar application schedule, other nodes such as Node N use time-synchronized local clocks to measure the ToF between the transmission of pulses 509 and reception of these pulses or echoes from reflecting sources 526.

Optionally, a switch point 535 may follow the radar application to provide for data exchange among nodes within the current communications frame. In the embodiment of FIG. 5, Node 1 changes from receive to transmit mode to transmit data 512, which is received by Node 1 as data 513, and also received by other nodes such as Node N as data 528. According to the data exchange schedule, Node 2 changes from receive to transmit mode to transmit data 515, and Node 1 changes from transmit to receive mode to receive data 519.

Node N also receives the transmitted data 515 as data 528. Node N then changes from receive to transmit mode according to the data exchange schedule and transmits data 529. Node 2 switches from receive to transmit mode and receives the transmitted data 529 as data 517. Node 1 also receives the transmitted data 529 as data 519. At some point in time 540, the clock synchronization among the modes has drifted far enough that no further data communications or radar application signaling can be successfully completed in the current communications frame, and a new communications frame must be initiated to resynchronize the local clocks in the nodes.

As those of skill in the art will understand, the design of schedules, such as for data exchange and radar application, must ensure the data communications and radar application signaling are completed prior to the point in time 540 where clock synchronization among the communicating nodes is no longer useful. Further, due to the drift of local clocks in the nodes, the content and format of data communications signals immediately following a frame synchronization preamble 502 may differ from the content and format of data communications signals exchanged following the optional switch point 535. Also, the durations of various time periods in the sequence depicted in FIG. 5 are determined, at least in part, by the number of communicating nodes in the system, the duration of the time-synchronization period, and the ranges of interest to be monitored by the radar application.

Figure 6:
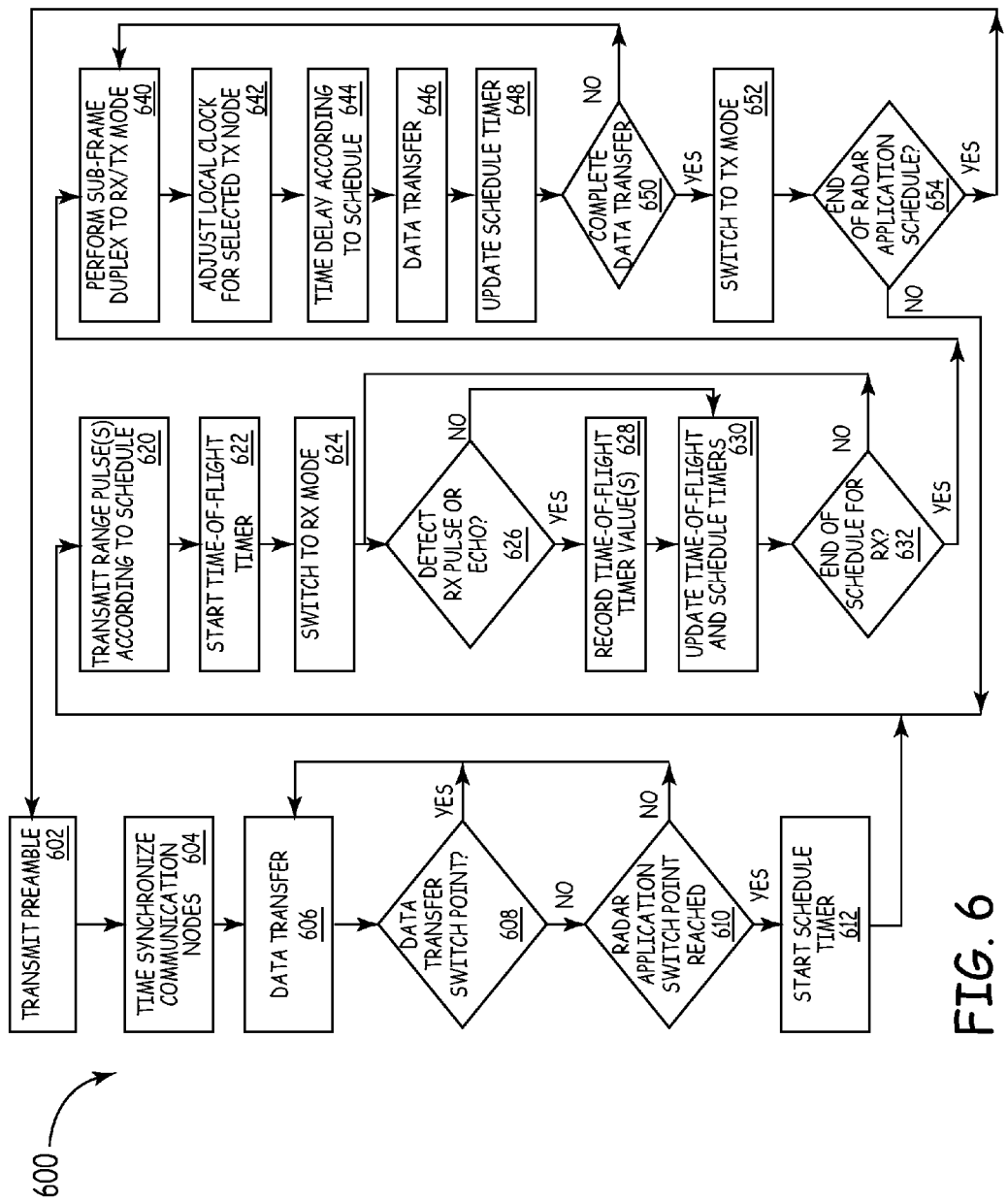
FIG. 6 is a flow diagram of a communication and transmission of radar signals of one embodiment of the present invention.

Referring to FIG. 6, a transmit flow diagram 600 of one embodiment of the present invention is illustrated. The transmit diagram begins by a node transmitting a preamble (602). One or more receiving nodes then time-synchronize local clocks during this preamble (604). Once the receiving nodes have been time-synchronized (604), data is transferred from the transmitting node (606). The data transfer (606) continues, and includes a check for a data transfer switch point (608). Such data may include, but is not limited to, schedules for data exchange and radar application. If a data transfer switch point is encountered (608), a sub-frame duplex for switching between transmitting and receiving functions in a node is performed by the currently transmitting node and a receiving node selected to transmit and the local clocks are adjusted in all nodes in response to the sub-frame duplex. If a data transfer switch point is not encountered in the check (608), then a subsequent check is made for a radar application switch point (610). If no radar application switch point is encountered, data transfer (606) continues.

If a radar application switch point (610) is encountered, then the communicating nodes respond to the radar application schedule with all nodes starting local schedule timers (612) and a selected node changing to transmit mode.

Figure 7:
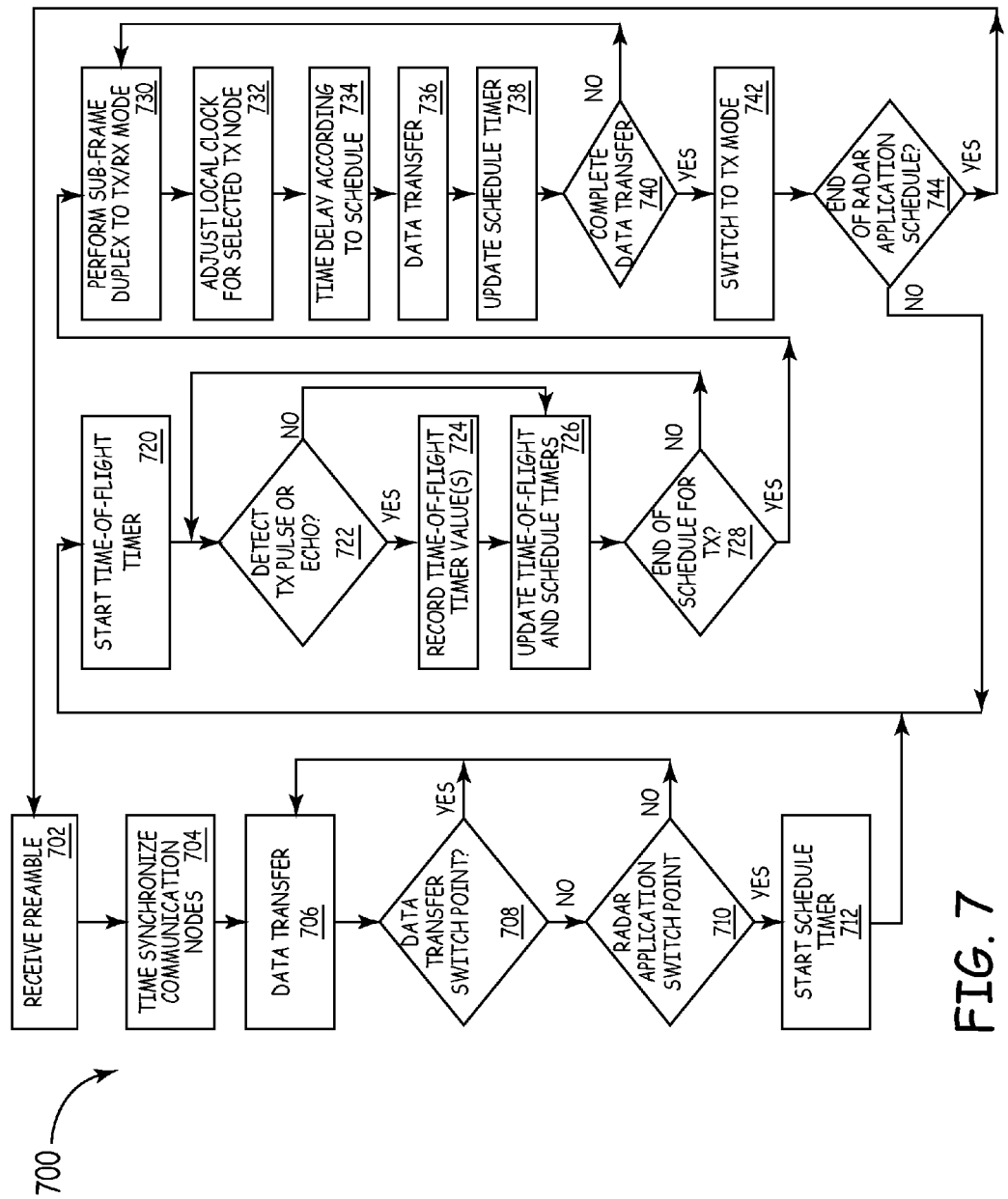
FIG. 7 is a flow diagram of communication and reception of radar signals of one embodiment of the present invention.

According to the schedule the selected node transmits one or more range pulses (620), and at the same time the transmit node and all receiving nodes start Time-of-Flight (ToF) timers (622) in accordance with the schedule. The transmit node then switches to receive mode (624) without performing a sub-frame duplex to measure the ToF of any pulse of reflected signal (626). Each node records the ToF for any detected signal (628), and updates the schedule and ToF timers (630) in that node. Each node then checks the schedule to determine if the period of time for receiving radar application signals has ended (632). If the schedule for receiving radar application signals is to continue, the nodes resume the detection of such signals (626). If the radar application schedule is to end, the communicating nodes respond to the switch point (632) by changing to a data exchange mode, which may optionally follow the radar application, by performing the sub-frame duplex function (640) at one or more nodes as selected by the schedule, including adjusting the local clock in each node to maintain time-synchronization with the selected transmit node (642). The schedule may include a time delay (644) to enable each node to process the measured ToF data obtained during the radar application. Data transfer (646) occurs from the selected transmit node to all receiving nodes according to the schedule. Each node updates a local schedule timer (648) for the purpose of following the schedule. The data transfer process is repeated (650) to enable each node to communicate measured and computed radar application data. When the data transfer is complete, the transmitting node switches to transmit mode (652) in preparation for the subsequent transmission of additional signals. If a check for ending the radar application (654) indicates additional radar application signaling and processing is to be performed, the process resumes with a selected node transmitting radar pulses (620). If the radar application is complete at the check (654), then the process continues with the node transmitting another preamble 602 to begin a new time-synchronized period of communication. FIG. 7 is a receiving flow diagram 700 of one embodiment of the present invention. The receiving flow diagram 700 starts by a node receiving a preamble (702) transmitted by another communicating node. In response to the preamble (702), a receiving node synchronizes its local clock to establish communication (704) between the nodes. Data is then transferred from the transmitting node to all receiving nodes (706). Such data may include, but is not limited to, schedules for data exchange and radar application. The data transfer continues (706), until a check for a data transfer switch point (708). If a data transfer switch point has been encountered (708), a sub-frame duplex is performed by the transmitting node to switch from transmitting to receiving mode and the local clocks are adjusted in the nodes performing the sub-frame duplex. The local clock is adjusted in this embodiment to take into consideration the propagation time between the nodes. If no data transfer switch point is encountered (708), then a check is made for a radar application switch point (710). If no radar application switch point is encountered, the processing continues with subsequent data transfer (706).

If a radar application switch point is encountered (710), then the communicating nodes switch modes according to a radar application schedule, and each node starts a schedule timer (712). According to a radar application schedule, a Time-of-Flight (ToF) timer is started (720) in each node. Each receiving node checks for detection of a radar pulse or reflected echo signal (722), recording the ToF values (724) for any such detected signals. The ToF and schedule timers are updated periodically (726), and a check is made for the end of the schedule for measuring ToF of radar signals (728). If the radar application schedule for measuring ToF (728) is not completed, then the process continues with detection of radar signals and echoes (722).

If the radar application schedule is to end, the nodes respond to the switch point (728) by changing to a data exchange mode, which may optionally follow the radar application, by performing the sub-frame duplex function (730) at one or more nodes as selected by the schedule, including adjusting the local clock in each node to maintain time-synchronization with the selected transmit node (732). The schedule may include a time delay (734) to enable each node to process the measured ToF data obtained during the radar application schedule. Data transfer (736) occurs from the selected transmit node to all receiving nodes according to the schedule. Each node updates a local schedule timer (738) for the purpose of following the schedule. The data transfer process is repeated (740) to enable each node to communicate measured and computed radar application data. The receiving nodes then change mode to receive mode (742) in preparation for subsequent signaling. If a check for ending the radar application (744) indicates additional radar application signaling and processing is to be performed, the process resumes with a selected node transmitting radar pulses and all receiving nodes starting a ToF timer (720). If the radar application is complete at the check (744), then selected nodes remain in receive mode to begin a new time-synchronized frame by receiving a preamble (702).

Figure 8:
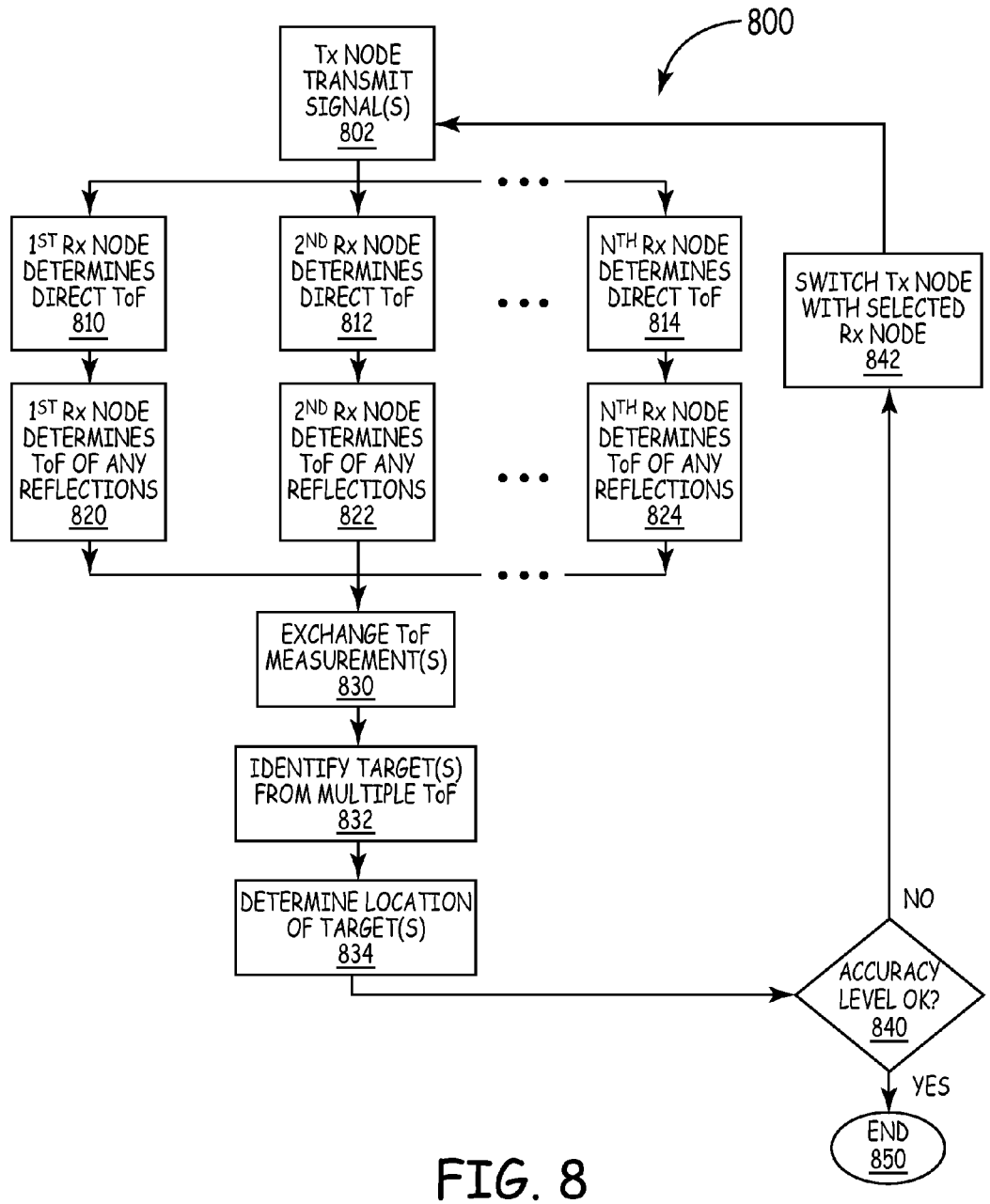
FIG. 8 is a flow diagram of a radar application of one embodiment of the present invention.

An example of a radar application system flow diagram 800 of one embodiment of the present invention is illustrated in FIG. 8. In this embodiment, a single transmitting node designated as the Tx node and multiple receiving nodes designated as a Rx nodes are illustrated. In this embodiment, the Tx node transmits a sub-frame with a ranging pulse(s) in accordance with a schedule (802). The elapsed time for the path of the ranging pulse directly to the Rx nodes is measured for the first, second and N-th nodes at blocks (810), (812) and (814) respectively. Measurement of the elapsed time for the echo path of the ranging pulse to the target and reflecting back to the first node is done at block (820), to the second node is done at block (822) and to the N-th node at block (824). When the schedule for receiving range signals is complete as described previously, the nodes exchange ToF measurement and computed data (830). One or more nodes process the exchanged data to identify targets (832), and determine the location of such targets (834). One or more nodes determine if the target location information is suitably accurate (840), and the process terminates for the current cycle if adequate target location accuracy has been achieved (850). If additional target location is required, or the target location accuracy requires improvement (840), the process continues with a selected node (842) transmitting ranging signals (802).

Figure 9B:
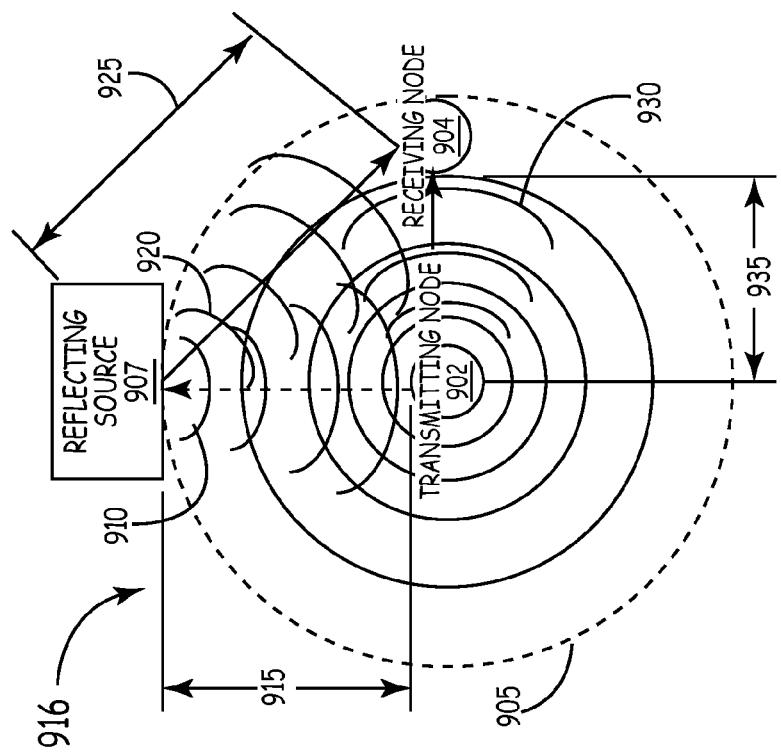
FIG. 9B is a representation of signals in another embodiment of the present invention.
Figure 9A:
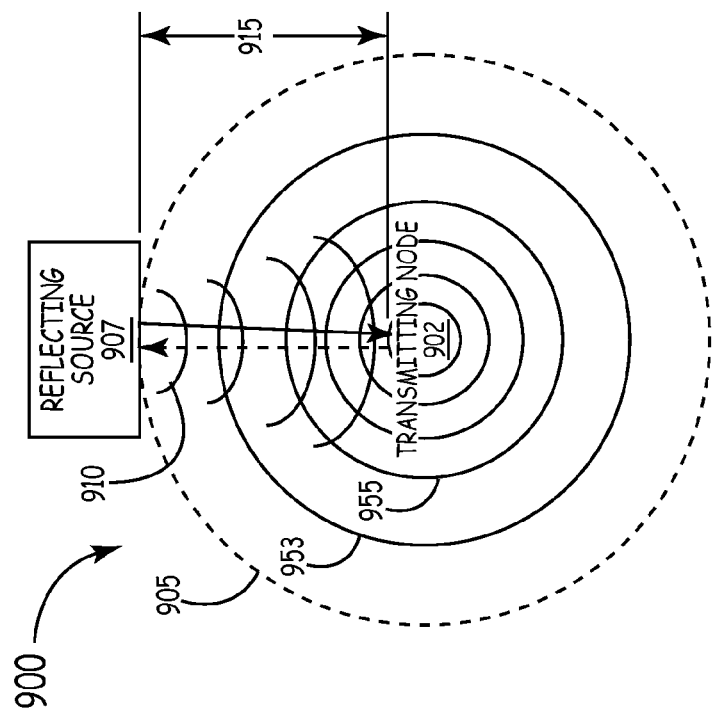
FIG. 9A is a representation of signals in one embodiment of the present invention.

In another embodiment, FIG. 9A illustrates a system 900 for approximating the location of a radar pulse signal reflecting source 907 relative to a radar pulse transmitting node 902. The radar pulse signal reflecting source can be generally be referred to as a reflecting source 907 or a target 907. Nodes in an ad hoc wireless network are expected to use omni-directional or isotropic antennas to successfully communicate with other such nodes regardless of node orientation. Such antennas ideally radiate three dimensional spherical propagation patterns, illustrated as the two dimensional circular concentric signals 955, 953 and 905. As the circular patterns propagate from the antenna at transmitting node 902 the radius of the propagating wavefront increases with time after initial transmission as illustrated by wavefronts 955, 953 and 905. When such a wavefront encounters a reflecting surface or object such as a reflecting source 907, the wavefront is reflected in many directions, possibly directly back in the direction of the transmitting node 902 as wavefront 910. With a known propagation velocity of the transmitted signal, the distance 915 between the transmitting node 902 and reflecting source 907 may be determined by measuring the round-trip Time-of-Flight (ToF) of a transmitted signal as described previously, dividing the value in half and multiplying by the propagation velocity of the signal. As those of skill in the art will understand, the single node system 900 is only able to determine a distance 915 between transmitting node 902 and reflecting source 907, not an exact location of the reflecting source 907 which is known only to have a location somewhere on a sphere with a radius of distance 915. Further, the accuracy of the determined distance 915 and the actual distance between transmitting node 902 and a reflecting source 907 is affected by various system and environmental factors, including but not limited to, the accuracy of the local clock in the node 902 used to measure the ToF of wavefronts 905 and 910 and the actual propagation paths of wavefronts 905 and 910. Also, the two dimensional circular shape of the propagating wavefronts 955, 953 and 905 illustrated in FIG. 9A are idealized for an omni-directional antenna, and in practice may vary considerably in uniformity from the shape illustrated in three dimensions and with time.

An improved system 916 for approximating the location of a radar pulse signal reflecting source 907 relative to a radar pulse transmitting node 902 is illustrated in FIG. 9B, consisting of two nodes, a transmitting node 902 and a receiving node 904. Wavefront 910 results from a signal transmitted by node 902 propagating as wavefront 905 after encountering a reflecting source 907. As previously described, measuring the ToF of wavefront 905 plus wavefront 910 may be used to determine the distance 915 between transmitting node 902 and reflecting source 907. Wavefront 905 may reflect in many directions when encountering reflection source 907, including in the direction of a receiving node 904, which is time-synchronized with transmitting node 902 and shares a radar application schedule with transmitting node 902 as previously described. Due to the time-synchronization of clocks on nodes 902 and 904, simultaneous ToF measurement of wavefront 905 and reflecting wavefronts 910 and 920 may be performed by node 902 and a node 904 respectively. Further, wavefront 905 propagates in all directions from node 902 due to the omni-directional antenna, including a wavefront 930 propagating directly towards receiving node 904 which is able to measure the direct ToF between node 902 and a node 904, and subsequently determine the distance 935 between node 902 and a node 904 by multiplying the measured ToF by the propagation velocity of the signal transmitted by node 902. Following an exchange of data between node 902 and a node 904 as previously described, one or both nodes may determine the distance 925 between the reflecting source 907 and a receiving node 904 as the ToF for wavefront 905 plus wavefront 920 measured by a node 904 minus the ToF for wavefront 905 measured by node 902 multiplied by the signal propagation velocity. By determining the three distances 915, 925 and 935, system 916 may locate reflecting source 907 more accurately than system 900. Those of skill in the art will understand the location of reflecting source 907 as determined by system 916 results in two possible solutions for the location of reflecting source 907. Further, the accuracy of the determined distances 915,925 and 935 and the actual distances between transmitting node 902, a reflecting source 907 and a receiving node 904 are affected by various system and environmental factors, including but not limited to, the accuracy of the local clocks in the node 902 and a node 904 used to measure the ToF of wavefronts 905, 910 and 920 and the direct wavefront from node 902 to a node 904 and the actual propagation paths of wavefronts 905, 910 and 920. Also, the two dimensional circular shape of the propagating wavefront 905 illustrated in FIG. 9B is idealized in two dimensions for an omni-directional antenna, and in practice may vary considerably in uniformity from the shape illustrated in three dimensions and with time.

Figure 9C:
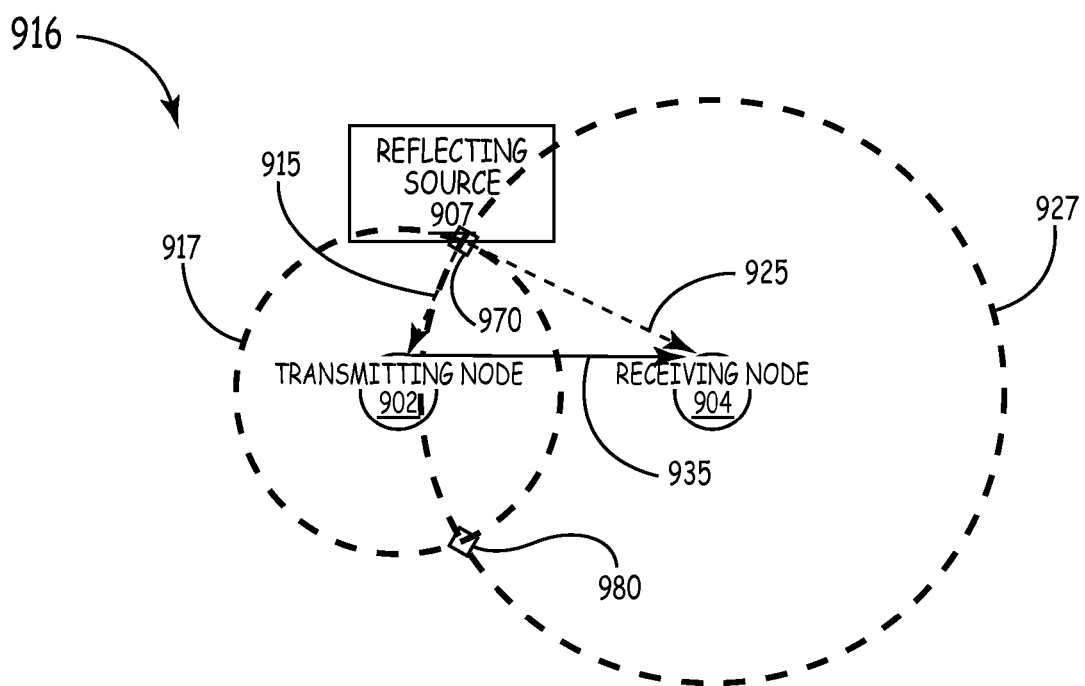
FIG. 9C is a diagram of a system for locating a reflecting source of one embodiment of the present invention.

FIG. 9C again depicts a system 916, illustrating the use of measured and determined ToF values for locating a reflecting source 907. Distance 915 between transmitting node 902 and reflecting source 907 is determined as previously described. Due to the omni-directional antenna on node 902 a distance 915 provides the location of reflecting source 907 as a spherical shell in three dimensions which is illustrated in FIG. 9C as a two-dimensional cross-section 917 having a mean radius equal to the distance 915 and a thickness equal to the accuracy of the determined distance 915 as previously described. Distance 925 between reflecting source 907 and receiving node 904 is determined as previously described. Due to the omni-directional antenna on node 904 the location of reflecting source 907 described by distance 925 is a spherical shell in three dimensions and illustrated in FIG. 9C as a two-dimensional cross-section 927 having a mean radius equal to the distance 925 and a thickness equal to the accuracy of the determined distance 925 as previously described. Distance 935 between node 902 and node 904 is determined as previously described. The points of intersection of the spherical shell cross-section 917 and cross-section 927 represent potential locations of the reflecting source 907 such as location region 970 and location region 980. Only one such location region is correct as indicated by location region 970 in FIG. 9C. An incorrect location region 980 results from the use of two nodes for determining the location of reflecting source 907.

Figure 9D:
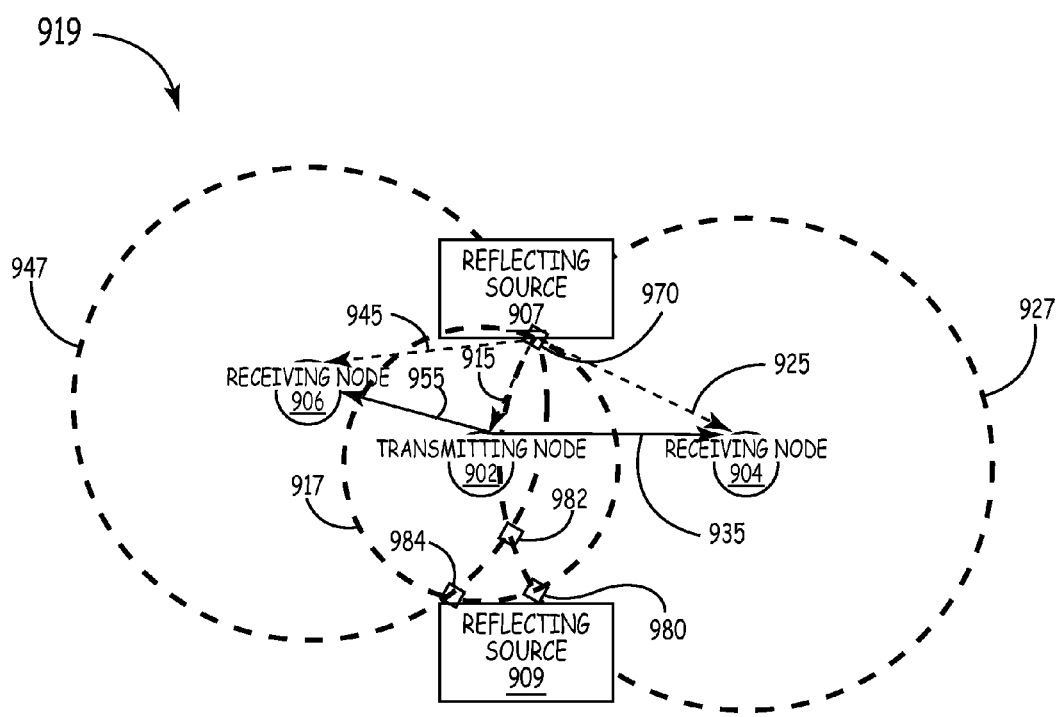
FIG. 9D is a diagram of another system for locating a reflecting source of one embodiment of the present invention.

A further improved system for determining the location of a reflecting source such as reflecting source 907 is depicted in FIG. 9D as system 919 consisting of three nodes, transmitting node 902 and a receiving node 904 and a receiving node 906. The distances between nodes such as 935 and 955 are determined as previously described. Further, the distances between a reflecting source 907 and communicating nodes such as distances 915, 925 and 945 are determined as previously described. Due to the omni-directional antenna on node 902 a distance 915 provides the location of reflecting source 907 as a spherical shell in three dimensions and illustrated in FIG. 9D as a two-dimensional cross-section 917 having a mean radius equal to the distance 915 and a thickness equal to the accuracy of the determined distance 915 as previously described. Distance 925 between reflecting source 907 and receiving node 904 is determined as previously described. Due to the omni-directional antenna on node 904 the location of reflecting source 907 described by distance 925 is a spherical shell in three dimensions and illustrated in FIG. 9D as a two-dimensional cross-section 927 having a mean radius equal to the distance 925 and a thickness equal to the accuracy of the determined distance 925 as previously described. Distance 925 between reflecting source 907 and receiving node 904 is determined as previously described. Due to the omni-directional antenna on node 906 the location of reflecting source 907 described by distance 945 is a spherical shell in three dimensions and illustrated in FIG. 9D as a two-dimensional cross-section 947 having a mean radius equal to the distance 945 and a thickness equal to the accuracy of the determined distance 945 as previously described. The points of intersection of the spherical shell cross-sections 917, 927 and 947 represent potential locations of the reflecting source 907 such as location region 970 and location regions 980, 982 and 984. Only one such location region is correct as indicated by location region 970 in FIG. 9C, as location regions 982 and 984 represent the intersection of just two spherical shell cross-sections. As those of skill in the art will understand, the relative locations of nodes 902, 904 and 906 and reflecting source 907 represent only one of many possible arrangements, including systems with many nodes. Further, the number of reflecting sources 907 may vary from none to very many, and is not a limitation of the present invention.

Figure 10:
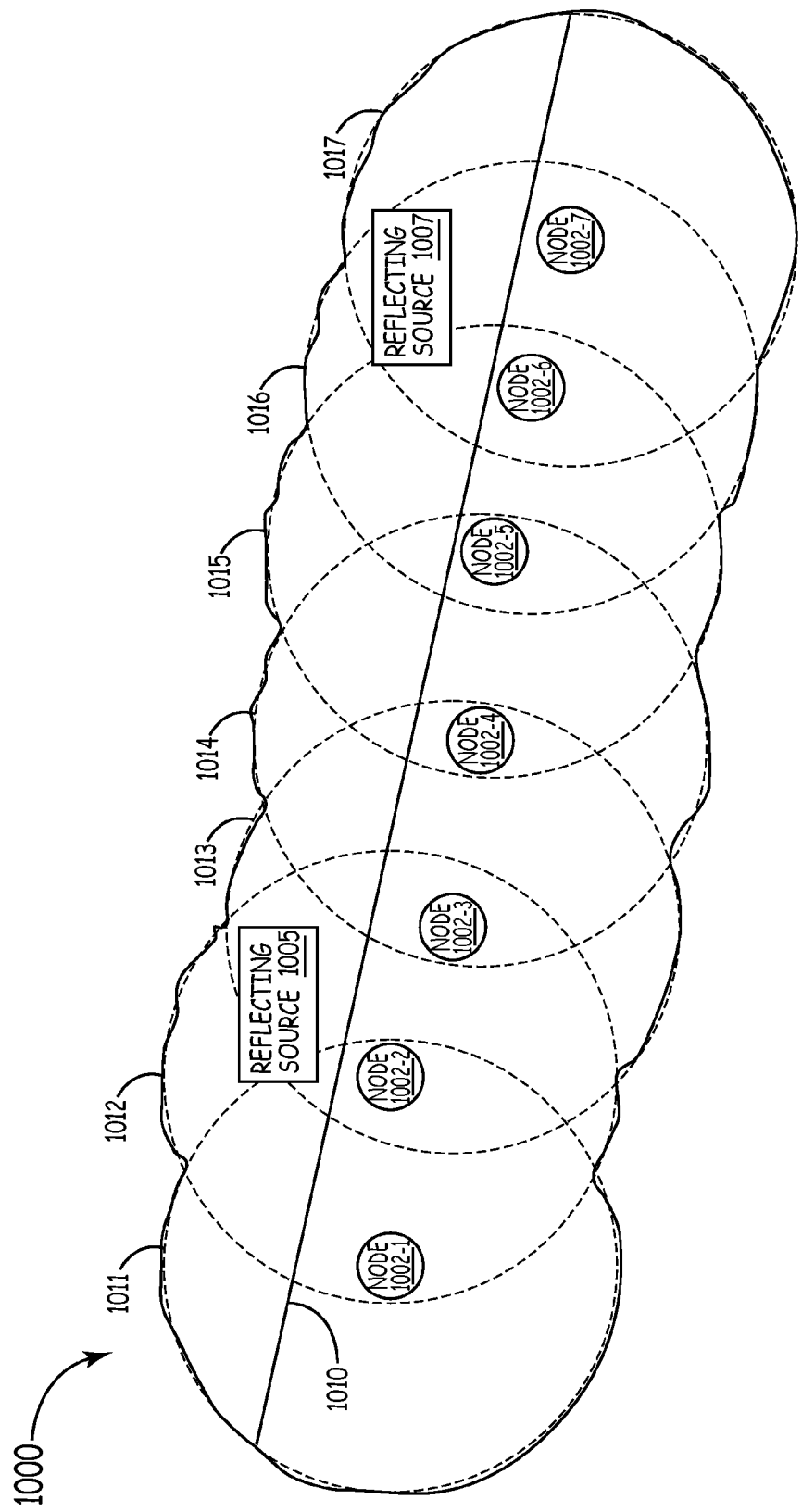
FIG. 10 is a diagram of an ad hoc wireless network radar application system of one embodiment of the present invention.

One embodiment of an ad hoc wireless network radar application system 1000 is depicted in FIG. 10 consisting of nodes 1002-1, 1002-2, 1002-3, 1002-4, 1002-5, 1002-6 and 1002-7 to form a system to detect reflecting sources such as 1005 and 1007 along the intended monitoring boundary 1010. Nodes 1002-*i* may act singly, in pairs, or groups of three or more nodes as previously described to detect the location of reflecting sources in the location regions 1011, 1012, 1013,

1014, 1015, 1016 and 1017. Such a system may be termed a picket line monitoring system and provides value by detecting the presence of any reflecting source in one or more of the location regions. As previously described, the location regions are depicted as spherical shell cross-sections in two dimensions instead of spherical shells in three dimensions.

Figure 11:
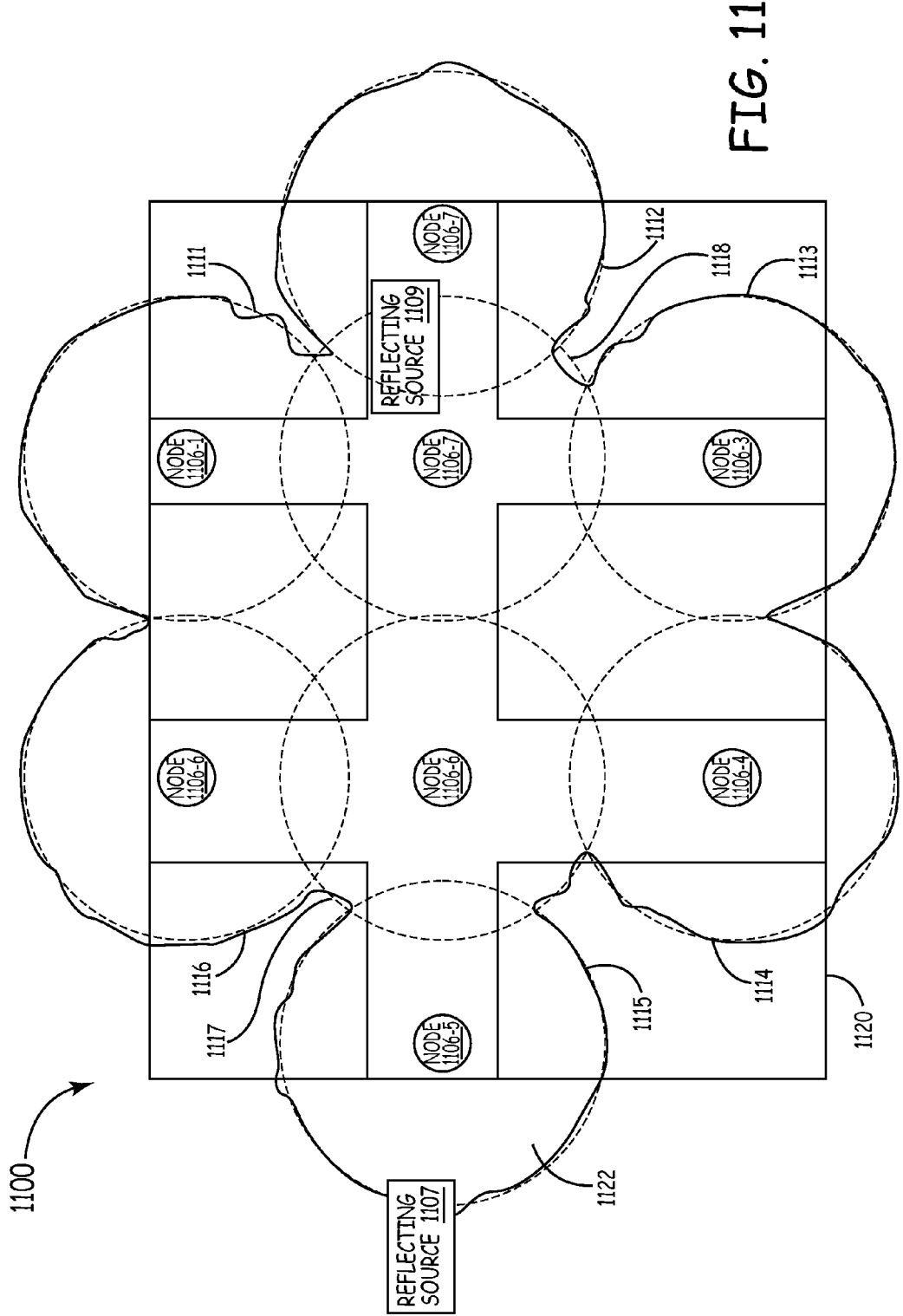
FIG. 11 is a diagram of another ad hoc wireless network radar application system of one embodiment of the present invention.

Another embodiment of an ad hoc wireless network radar application system 1100 is depicted in FIG. 11 consisting of nodes 1106-1, 1106-2, 1106-3, 1106-4, 1106-5, 1106-6 and 1106-7 to form a system for detecting reflecting sources such as 1107 and 1109 within the location region 1122 resulting from the overlap of location regions 1111, 1112, 1113, 1114, 1115, 1116, and 1117 near points of access to the monitoring boundary 1120 and within the monitoring boundary 1120. Nodes 1106-$i$ may act singly, in pairs, or groups of three or more nodes as previously described to detect the location of reflecting sources in the location regions 1111, 1112, 1113, 1114, 1115, 1116, and 1117. If monitoring boundary 1120 represents a structure, then such a system may be termed a structure monitoring system and provides value by detecting the presence of any reflecting source in one or more of the location regions. As previously described, the location regions are depicted as cross-sections in two dimensions of spherical shells in three dimensions, enabling one of more of the nodes 1106-$i$ to detect a reflecting source on multiple floors of a multi-floor structure.

Figure 12:
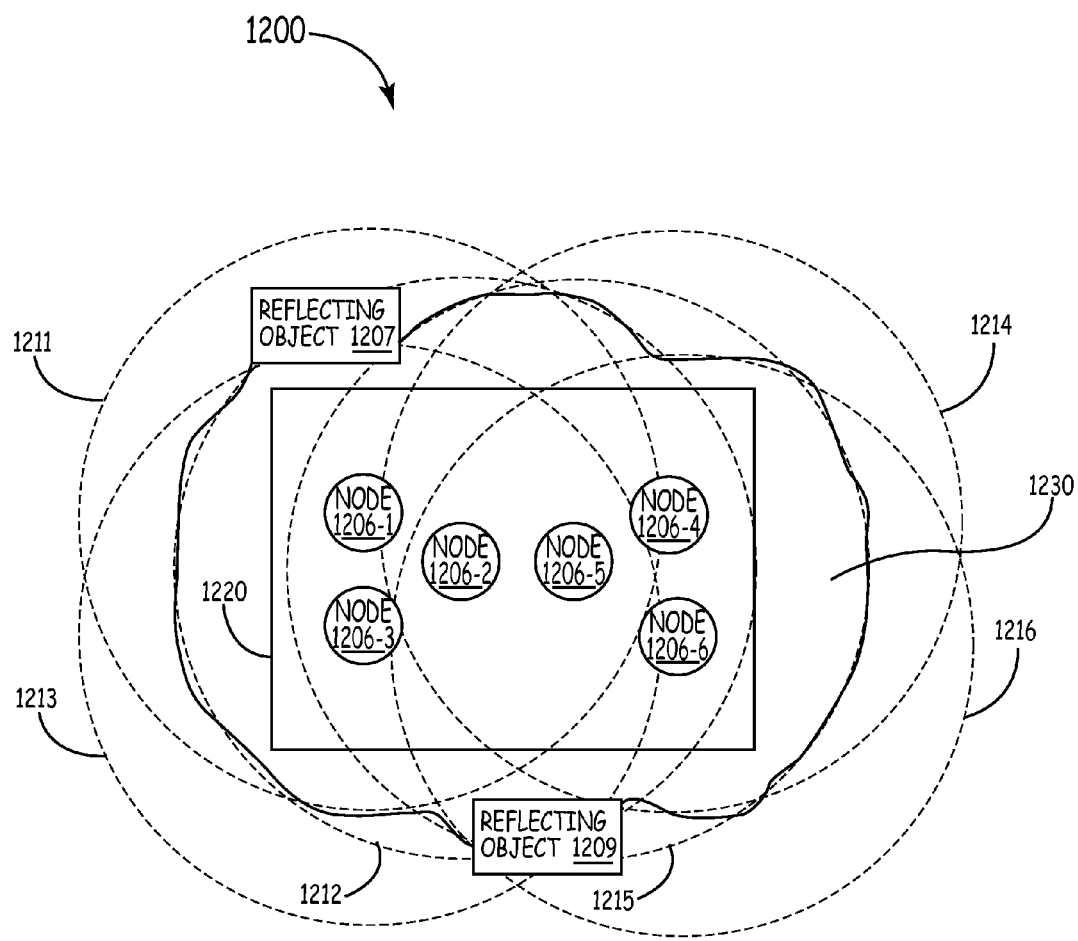
FIG. 12 is a diagram of yet another ad hoc wireless network radar application system of one embodiment of the present invention.

Another embodiment of an ad hoc wireless network radar application system 1200 is depicted in FIG. 12 consisting of nodes 1206-1 through 1206-6 to form a system for detecting reflecting sources such as 1207 and 1209 which may be present outside of a specific perimeter such as 1220. The system detection region 1230 results from the overlap of three of more location regions 1211 through 1216. As previously described the system 1200 is capable of uniquely determining the location of one or more reflecting objects such as 1207 and 1209 due to the exchange of measured and determined data exchanged among the nodes as previously described. If monitoring boundary 1220 represents a structure or area to be monitored, then such a system may be termed an area monitoring and detection system and provides value by detecting the presence of any reflecting source and providing unique location information for any reflecting sources in the detection region 1230. As previously described, the location regions for each node are depicted as cross-sections in two dimensions of spherical shells in three dimensions, enabling the detection region to also have three dimensions.

Although specific embodiments have been illustrated and described herein, it will be appreciated by those of ordinary skill in the art that any arrangement, which is calculated to achieve the same purpose, may be substituted for the specific embodiments shown. For example, although, ad hoc wireless network systems using omni-directional antennas are discussed above, the same principles can be applied to systems with directional antennas. Accordingly, the present invention is not limited to systems with omni-directional antennas. This application is intended to cover any adaptations or variations of the present invention. Therefore, it is manifestly intended that this invention be limited only be the claims and the equivalents thereof.

What is claimed is:

1. A method of using a wireless communication system to determine locations, the method comprising:
    exchanging communication frames between at least two synchronized nodes in the communication system, wherein each communication frame includes at least one of data signals and radar signals;
    determining distances of at least one of the nodes and at least one reflective source based at least in part on at least one of direct radar signals and reflected radar signals; and
    determining locations of at least one of the nodes and the at least one reflective source based on the determined distances.

2. The method of claim 1, further comprising:
    synchronizing local clocks in the at least two nodes of the communication system with a frame preamble in an initial communication frame; and
    exchanging the communication frames between the at least two nodes without additional frame preambles while synchronization is adequate for exchange.

3. The method of claim 2, wherein at least one of the initial communication frame and the communication frames includes schedule data for the transmission of at least one of data signals and radar signals.

4. The method of claim 1, wherein the radar signals are transmitted after at least one switch point has been detected.

5. The method of claim 1, wherein the data signals includes data relating to at least one of scheduling, time of flight of received radar signals, the determined distances and the non-receipt of reflected signals.

6. The method of claim 1, wherein determining distances of at least one of the nodes and at least one reflective source further comprises:
    determining a distance between a first node of the at least two nodes and the at least one reflecting source;
    determining the distance between the first node and a second node of the at least two nodes; and
    determining the distance between the second node and the at least one reflecting source.

7. The method of claim 6, wherein determining the distance between the first node and a second node of the at least two nodes further comprises:
    transmitting a first radar signal from the first node to the second node; and
    based on the time that passed between the transmission of the first radar signal from the first node to the receiving of the first radar signal at the second node, determining the distance.

8. The method of claim 6, wherein determining a distance between a first node of the at least two nodes and a first reflecting source of the at least one reflecting source further comprises;
    transmitting a first radar signal from the first node;
    switching the first node to a receiving mode;
    receiving the radar signal reflected off of the first reflecting source; and
    based on the time that passed between the transmitting and the receiving of the radar signal, determining the distance.

9. The method of claim 6, wherein determining the distance between the second node and a first reflecting source of the at least one reflecting source further comprises:
    subtracting the distance between the first node and the first reflecting source from a distance based on a time that passed between the transmission of first radar signal that is reflected off of the first reflecting source and the receipt of the reflected first radar signal at the second node.

10. The method of claim 6, further comprising:
    determining the location of the at least one reflecting source by determining points of intersections of spherical shells formed by the distance determinations and accuracy of the distance determinations.

11. A method of determining a location for at least one reflective source, the method comprising:
- establishing communications between a plurality of nodes with an initial communication frame from an initial transmitting node that includes a frame preamble, wherein the frame preamble is used by each of the plurality of nodes to synchronize a respective local clock;
- exchanging at least one schedule between the plurality of nodes;
- exchanging at least one of subsequent data communications between the plurality of nodes in communication sub-frames without an additional preamble according to the exchanged schedule;
- transmitting range pulses according to the schedule;
- determining time of flight of received range pulses, wherein at least one range pulse is reflected off each reflective source;
- determining distances based on the determined time of flight of received range pulses;
- exchanging distance determinations between nodes in the subsequent data communications; and
- determining the location of each reflective source in relation to the plurality of nodes based on the determined distances.

12. The method of claim 11, further comprising:
transmitting data from a node pursuant to a detected data switch point.

13. The method of claim 11 further comprising:
starting a radar application at a node based on a radar application switch point.

14. The method of claim 13, further comprising:
- upon detection of a radar application switch point by a node, staffing a schedule timer;
- transmitting at least one range pulse according to the schedule;
- switching to receive mode;
- starting a time of flight timer;
- when a reflected pulse is detected by the node, recording a time of flight value;
- when a reflected signal is detected, recording a time of flight value;
- updating the time of flight timer; and
- updating the schedule timer.

15. The method of claim 14, further comprising:
- performing a sub-frame duplex to change the node into a transmitting node pursuant to the schedule;
- adjusting a local clock of the node;
- adding a select time delay according to the schedule;
- transferring data;
- updating schedule timer; and
- when transmission is complete, switching node to a receiving mode.

16. The method of claim 15, further comprising:
when it is determined that an end of the radar application has occurred pursuant to the schedule, monitoring for a communication frame with another preamble.

17. The method of claim 15, further comprising:
when it is determined that an end of the radar application has occurred pursuant to the schedule at the initial transmitting node, transmitting a communication frame with another preamble with a selected node for transmitting.

18. A communication and location determining system, the system comprising:
a plurality of nodes, each node configured to be synchronized with a frame preamble in an initial communication frame exchanged between the nodes, each node further configured to communicate between the nodes for a period of time without any additional preambles, each node further configured to determine distances to other nodes and reflective sources based on time of flight of direct and reflected ranging signals, each node further configured to determine locations of other nodes and reflective sources using the determined distances to the other nodes and reflective sources.

19. The system of claim 18, wherein each node comprises:
- a local clock;
- a clock synchronization circuit configured to synchronize the local clock based on information in a frame preamble in an initial communication frame;
- a transmitter configured to transmit data and ranging pulses;
- a receiver configured to receive data and ranging pulses;
- at least one timer; and
- a processor configured to control the at least one timer, the synchronization circuit, and the transmitter, the processor further configured to process received data and ranging pulses, the controller further configured to determine to locations to other nodes and reflective sources.

20. The system of claim 19, wherein the at least one timer further comprises at least one of a schedule timer configured to track the timing in a schedule exchanged between the nodes, at least one time-of-flight timer configured to track the time of flight of direct and reflected ranging pulses and a delay timer to determine when a specific time period has elapsed related to the schedule.

* * * * *